US011688222B2

(12) United States Patent
Dion et al.

(10) Patent No.: US 11,688,222 B2
(45) Date of Patent: Jun. 27, 2023

(54) LOW-COST APPARATUS AND METHOD FOR DISTRIBUTED REMOTE COLLECTION OF ELECTRONIC DEVICES FOR VALUE

(71) Applicant: A LA CARTE MEDIA, INC., Montreal (CA)

(72) Inventors: Dominique Dion, Montreal (CA); Tony Mastronardi, Montreal (CA)

(73) Assignee: A LA CARTE MEDIA, INC., Montreal (CA)

( * ) Notice: Subject to any disclaimer, the term of this patent is extended or adjusted under 35 U.S.C. 154(b) by 0 days.

(21) Appl. No.: 16/630,556

(22) PCT Filed: Jul. 13, 2018

(86) PCT No.: PCT/IB2018/055219
§ 371 (c)(1),
(2) Date: Jan. 13, 2020

(87) PCT Pub. No.: WO2019/012506
PCT Pub. Date: Jan. 17, 2019

(65) Prior Publication Data
US 2020/0393742 A1     Dec. 17, 2020

Related U.S. Application Data

(60) Provisional application No. 62/532,526, filed on Jul. 14, 2017.

(51) Int. Cl.
*G07F 7/06* (2006.01)
*A47G 29/14* (2006.01)
(Continued)

(52) U.S. Cl.
CPC ............. *G07F 7/06* (2013.01); *A47G 29/141* (2013.01); *G03B 15/06* (2013.01);
(Continued)

(58) Field of Classification Search
CPC .......... G06Q 30/0278; G06Q 30/0237; G06Q 20/18; G06Q 20/322; G06Q 30/018; G06Q 30/0208; G06T 7/0002
See application file for complete search history.

(56) References Cited

U.S. PATENT DOCUMENTS 9,224,137 B1 * 12/2015 Tomasi ................. H02K 7/14
2002/0176250 A1 * 11/2002 Bohler ............... F21V 19/0005
362/236
(Continued)

FOREIGN PATENT DOCUMENTS

JP      2006-201982     8/2006
JP      2016-519355     6/2016

OTHER PUBLICATIONS

International Search Report for PCT/IB2018/055219, dated Nov. 5, 2018, 2 pages.
(Continued)

*Primary Examiner* — Jeremiah C Hallenbeck-Huber
(74) *Attorney, Agent, or Firm* — Nixon & Vanderhye, PC

(57) ABSTRACT

A handheld-device imaging and collection apparatus, associated techniques and systems are described. An example apparatus may include a first container and a second container attached to each other. The first container includes a top panel arranged to enable acquiring a clear view of an inside of the first container, and one or more mirrors arranged facing inside of the first container, such that an image captured by a camera through the top panel captures reflections, in the one or more mirrors, of an handheld-device placed inside the first container. The second container includes a collection chamber configured to store the handheld-device.

20 Claims, 15 Drawing Sheets

(51) Int. Cl.
*G03B 15/06* (2021.01)
*G06Q 30/02* (2023.01)
*H04N 7/04* (2006.01)
*H04W 4/12* (2009.01)

(52) U.S. Cl.
CPC .......... *G06Q 30/0278* (2013.01); *H04N 7/04* (2013.01); *H04W 4/12* (2013.01); *A47G 2029/145* (2013.01); *A47G 2029/149* (2013.01)

(56) References Cited

U.S. PATENT DOCUMENTS

| | | | | |
|---|---|---|---|---|
| 2007/0296545 | A1* | 12/2007 | Clare | G07C 9/00571 340/5.64 |
| 2012/0301009 | A1* | 11/2012 | Dabic | G07D 5/005 382/136 |
| 2013/0124426 | A1* | 5/2013 | Bowles | G06Q 30/08 705/308 |
| 2013/0198144 | A1* | 8/2013 | Bowles | G06Q 30/0278 707/668 |
| 2013/0279011 | A1* | 10/2013 | Kubota | G02B 27/00 359/613 |
| 2013/0281223 | A1* | 10/2013 | Lee | A63B 69/3661 473/156 |
| 2015/0177067 | A1* | 6/2015 | Golgotiu | G01N 21/255 356/402 |
| 2015/0330910 | A1 | 11/2015 | Nguyen et al. | |
| 2016/0098688 | A1* | 4/2016 | Hunt | G06Q 20/18 705/308 |
| 2016/0098689 | A1 | 4/2016 | Bowles et al. | |
| 2016/0275460 | A1* | 9/2016 | Ploetner | G07F 7/06 |
| 2017/0083886 | A1* | 3/2017 | Silva | G07F 9/026 |
| 2017/0293983 | A1* | 10/2017 | Long, II | G06Q 20/18 |
| 2017/0323279 | A1* | 11/2017 | Dion | G07F 17/3216 |
| 2018/0068088 | A1* | 3/2018 | Webb | G06Q 20/34 |
| 2021/0307259 | A1* | 10/2021 | Setlur | A01G 9/26 |

OTHER PUBLICATIONS

Written Opinion of the ISA for PCT/IB2018/055219, dated Nov. 5, 2018, 4 pages.
Extended European Search Report EP Application No. 18 83 2332 dated Mar. 15, 2021.
Japanese Office Action for Application No. 2020-501463 dated Apr. 12, 2022, with English translation, 12 pages.

* cited by examiner

LOW-COST APPARATUS AND METHOD FOR DISTRIBUTED REMOTE COLLECTION OF ELECTRONIC DEVICES FOR VALUE

CROSS-REFERENCE TO RELATED APPLICATIONS

This application is the U.S. national phase of International Application No. PCT/IB2018/055219 filed Jul. 13, 2018, which designated the U.S. and claims the benefit of priority from U.S. Provisional Application No. 62/532,526 filed Jul. 14, 2017, the entire contents of which is incorporated by reference. This application is related to U.S. patent application Ser. No. 15/598,004 filed on May 17, 2017, and U.S. patent application Ser. No. 15/153,137 filed on May 12, 2016, the entire contents of each of which are hereby incorporated by reference.

FIELD OF THE TECHNOLOGY

The technology presented herein relates to systems and methods related to the remote collection of small electronic devices in exchange for value. For example, the technology presented herein may be used in a distributed set of kiosks configured to accept a client's used electronic device, such as, for example, a smartphone, tablet computer, a smart watch or the like, and to provide the client with an amount in money or equivalent for an estimated value of that accepted used electronic device.

BACKGROUND

Many people often find themselves in situations where, after having bought a new smartphone or some other consumer electronic device to replace an older device, they would like to conveniently and safely dispose of the old device. In many instances, such persons may desire to trade the old device for some monetary gain. Although they may use a service such as Ebay or the like to list and sell the old device, such avenues for disposing old devices are not convenient in that one must manually perform a number of steps such as listing the device for sale, monitoring purchase offers, provide the buyer with the device via mail or other manner, wait a relatively long time before receiving the money from the buyer, and even after the transaction has completed, still run the risk of subjecting oneself to adverse comments by the buyer and/or return of the device.

Distributed collection centers, such as collection kiosks (herein sometimes also referred to as "booths") that are configured to accept a client's smartphone and to then provide the client with an amount of money corresponding to an estimated value are known, such as those provided by ecoATM™. However, further improvements are desired in order to make the process of trading in old consumer electronic devices more convenient for clients and more reliable and efficient for the kiosk operators (e.g., kiosk owners, entity responsible for collecting electronic devices from multiple kiosks for subsequent trading).

Embodiments disclosed in this application provide for remote distributed collection kiosks for efficiently collecting certain electronic devices.

SUMMARY

A handheld-device imaging and collection apparatus, associated techniques and systems are described. An example apparatus may include a first container and a second container attached to each other. The first container includes a top panel arranged to enable acquiring a clear view of an inside of the first container, and one or more mirrors arranged facing inside of the first container, such that an image captured by a camera through the top panel captures reflections, in the one or more mirrors, of an handheld-device placed inside the first container. The second container includes a collection chamber configured to store the handheld-device.

DETAILED DESCRIPTION

Exemplary embodiments of this disclosure include an electronic device collection kiosk that facilitates remote distributed collection of electronic devices in exchange for a monetary value or other value. The electronic devices that may be collected in these kiosks may include consumer electronic devices or portable electronic devices such as, but not limited to, smartphones, tablet computers, smart watches, game devices, personal health monitoring devices, or other processor-based electronic devices. In some cases, it may be expected that the kiosks described herein will more frequently collect smartphones and the like which are in widespread use and are often replaced with newer versions on a relatively short (e.g., 2-4 years) replacement cycle by many consumers. These embodiments will be described with reference to the accompanying drawings. It should be noted that the embodiments described below are illustrative only, in order to describe, for example, the electronic device collection kiosk according to this disclosure is formed and operated, and it is not intended to limit the electronic device collection kiosk or the like according to this disclosure to specific configurations described below. Other specific configurations may be employed as appropriate according to the embodiments.

Example embodiments provide a mini kiosk for evaluating and collecting portable devices such as smartphones, portable game devices, portable media players, and the like. The mini kiosks are designed so that they cost substantially less than the type of kiosks described, for example, in U.S. application Ser. No. 15/598,004. In at least some of the example embodiments, the mini kiosks are configured to be capable of accepting the full range of portable devices accepted by the full size kiosk 102 described in U.S. Ser. No. 15/598,004. In some other example embodiments, the mini kiosks may be designed to accept only some of the portable device types (e.g., accept smartphones but not devices as large as the 9.7 inch iPad) that are frequently traded by users. The mini kiosks can, at least in part due to their lower cost, be deployed in substantially greater numbers and/or in substantially higher densities to facilitate higher number of portable devices being collected. The lower cost of the mini kiosks enable each mini kiosk to be profitable with a lower number of portable devices collected per collection period. Thus, for example, a mini kiosk may be deployed at each retail outlet of one or more wireless service providers where users typically come to get new portable devices, have their portable devices examiner and repaired, etc.

Figure 1:
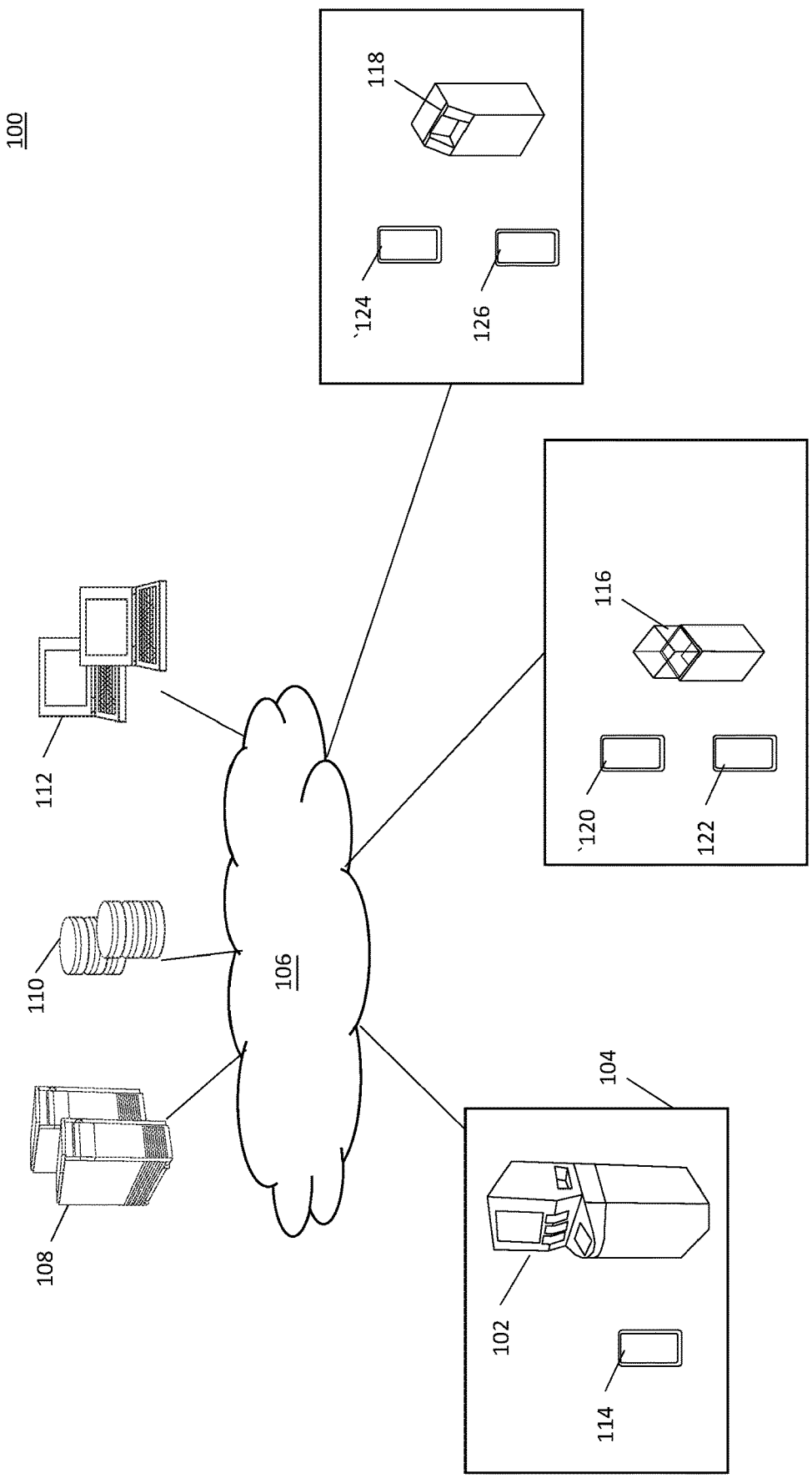
FIG. 1 illustrates a system view of a network of remote distributed electronic device collection kiosks having different types of kiosks, according to some embodiments.

FIG. 1 illustrates a system 100 comprising a network of distributed electronic device collection kiosks, according to certain example embodiments. A plurality of electronic device collection kiosks (hereinafter referred to simply as "kiosk(s)") 102, 116 and 118 are located at various geographically distributed locations. Each kiosk 102, 116 and 118 may be physically located within a respective kiosk premise 104. Each kiosk premise 104 may be a building or other area under the supervision of, for example, a retail store or other enterprise.

The kiosks 102, 116 and 118 and/or their premises are connected via one or more communication networks 106 to data processing servers 108, data storage 110 and a call center 112. Whereas kiosks 102 and 118 may themselves communicate with the network and/or data processing servers 108 etc., another device such as a client's second smartphone (e.g., portable device 122 below, where the client is submitting the first smartphone for trade) or kiosk premise representative's (e.g., sales person at a shop which houses kiosk 116) smartphone which is in proximity to kiosk 116 may communicate with the network and data processing servers 108 to support the trades associated with kiosk 116 because kiosk 116 may not have its own communication capabilities. The network 106 may include, but is not limited to, the Internet and/or one or more other communications networks such as local area networks, wide area network, cellular connection, and/or point-to-point communication connections.

The data processing servers (sometimes referred to herein as central servers) 108, storage servers 110 and call center 112 may be located at the same geographical location or at different locations. The processing servers 108 may include one or more of any type of computers and are configured to perform processing and/or analysis of data collected at the kiosks 102, 116 and 118 and/or at the respective kiosk premises, and information related to the electronic devices that are being collected at the kiosks 102, 116 and 118. The processing at one or more processing servers 108 may include real-time processing of information with respect to a currently ongoing transaction between a kiosk or another device operating in support of the kiosk in the network and a client. For example, the information transmitted by a kiosk or another device operating in support of a kiosk during a trade transaction can be progressively monitored and analyzed, for example, by comparing known information about the device currently being traded to information about known counterfeits. In some embodiments, the processing servers may receive and process information acquired by a trade device during an evaluation or pre-evaluation process. In yet other embodiments, another device (e.g., a smartphone other than the trade device) may acquire images and other information regarding a trade device and/or user and may transmit to the processing servers for processing. In certain example embodiments, processing servers 108 may include, or may access, a pricing server which is configured to provide suggested prices for various types of electronic devices identified at a kiosk. As further described below, in some example embodiments, one or more processing servers 108 may keep track of a fundraising project or the like that is spread across the kiosks. The processing servers 108 may also include a pricing server which, with the assistance of a pricing database in databases 110 including pricing information and pricing determination configuration parameters, operate to provide querying kiosks with pricing and pricing related information for various portable electronic devices. Given the virtualization of today's computing, the word server used herein may also refer to computing servers that may be running on one or more physical or virtual computers.

The data storage servers 110 are configured to store information related to electronic devices that may be collected at the kiosks, and data collected at the kiosks and/or kiosk premises (e.g., session data, client information, information regarding consumer electronic devices submitted by clients for analysis, information regarding other activities (e.g., fundraising activities) associated with the kiosks etc.). The data storage servers 110 may comprise any type of digital data storage devices and may use any type of database and/or file structure to collect and maintain the stored data. The data storage servers 110 may also have databases storing profiles for any type of devices that are accepted by kiosks, and performance metrics (e.g., time to complete certain test instructions per model) etc. For example, one or more images from each type of device previously processed by and/or accepted at any of the kiosks may be stored in order to be used in automated recognition of devices. Pricing information for already completed transactions, and for other known portable electronic devices may also be stored.

The call center 112 may be configured to enable one or more operators ("call center agents" or "call center operators") to interact with users (e.g., clients) who are close to and/or are interacting with any one of the kiosks 102 and 118 and/or another communication device at premises of kiosk 116. The interaction may include one or more of audio, video and data feed. For example, when a person is in close proximity to one of the kiosks 102 in order to submit his electronic device 114 to the kiosk, one or more operators via terminals in the call center 112 may interact with the client regarding the submission of electronic device 114. The interaction may be facilitated by the audio, video and/or data interfaces of the kiosk 102 and/or the user's device 114. In some example embodiments, the services provided by the call center operators may be grouped into two or more classes of services, as described below. In some embodiments, at least some of the call center operators may be fully or partially automated.

The kiosks 102, 116 and 118 may each be of different types. Kiosks 102 may be referred to as full-featured kiosks, and are kiosks described in U.S. patent application Ser. No. 15/598,004 and U.S. patent application Ser. No. 15/153,137 whose descriptions of the kiosk are herein incorporated by reference. As described in the references patent applications, each kiosk 102 may include one or more displays, one or more touchscreens, payment dispenser(s), fingerprint detector, an imaging chamber with associated mechanical mechanisms to move the electronic device for imaging and after the imaging, fixed cameras for imaging the electronic device, one or more cameras for detecting and monitoring users, one or more computer processor to control scanning, communications and displays, etc. With all its sophistication and capabilities, kiosk 102 may have a cost that makes it monetarily impractical to deploy at locations where only a small number of electronic devices are collected.

Kiosk 116 may be referred to as a "computer-less" mini kiosk. Like kiosks 102 and 118, computer-less mini kiosk 116 is also designed to facilitate evaluation of electronic devices and to collect evaluated electronic devices. Kiosk 116, being "computer-less", may, in some embodiments, have no processors, and in some embodiments, may have one or more processors or simpler electronic controllers, such as, for example, an Arduino electronic platform, other controller kits, single board controllers such as or similar to the Make Controller kit, or a custom electronic implementation including, for example, micro controllers, switches and other basic electronics for controlling functions such as, for example, opening or unlocking a door, moving a tray door etc., other than image capturing and transmitting the captured images to the server. When a user has an electronic device 120 to be traded for value using the kiosk 116, since the kiosk 116 may not have its own communication facilities, the servers 108 and 112 rely upon another portable device 122 to capture images of the electronic device, to transmit the captured images, and to provide for interacting with the user who is intending to trade electronic device 120. Portable device 122 may include, for example, a smartphone (e.g., a retail location employee's smartphone), a tablet (e.g., iPad), a media player (e.g., iPod), a smart watch with camera, etc. In some embodiments, device 122 may be a desktop/laptop/notebook/ultrabook/tablet computer that may be communicatively connected with a camera. More details regarding kiosk 116 can be found below in relation to FIGS. 2-3.

Kiosk 118 is a mini kiosk, and like kiosks 102 and 116, kiosk 118 is also designed to facilitate evaluation of electronic devices and to collect evaluated electronic devices. Kiosk 118 may include some or all of one or more processors, one or more cameras, one or more routers, etc. Thus, although still less full featured compared to the full-featured kiosk 102, kiosk 118 includes more capabilities and functions than the "computer-less" mini kiosk 116. Kiosk 118 may be configured to either use a camera of an electronic device 126 (e.g., similar to electronic device 122 above) or a built in camera to capture images of a trade-in electronic device 124 (e.g., similar to electronic devices 114 or 120 above). More details regarding kiosk 118 can be found below in relation to FIGS. 2-4.

Both mini kiosks 116 and 118 provide for evaluating and collecting portable devices, albeit with less of the accompanying functions of the full-sized kiosk 102 so that the manufacturing and/or maintenance costs are lower and deployment in greater numbers can be facilitated.

Figure 2:
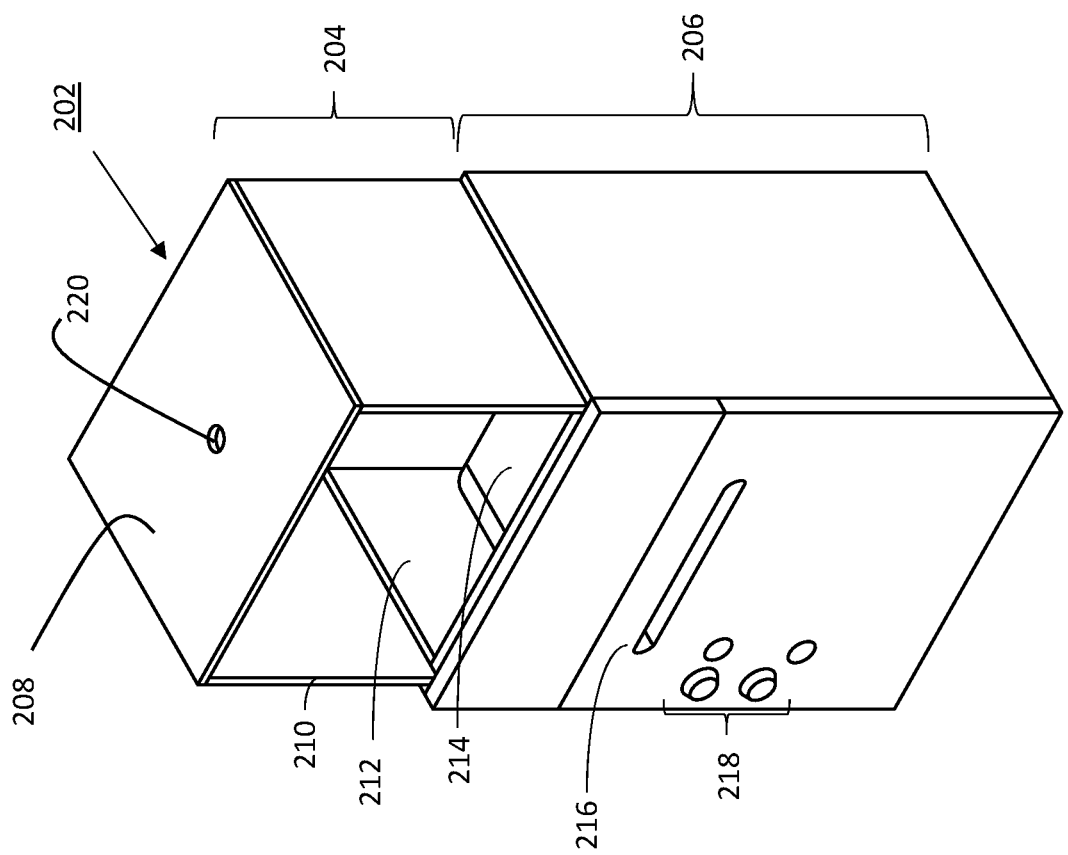
FIG. 2 illustrates a "computer-less" electronic device collection kiosk, according to some embodiments.

FIG. 2 illustrates a "computer-less" electronic device collection kiosk 202, such as mini kiosk 116 described above, according to some embodiments.

Kiosk 202 is a mini kiosk for imaging and collection of electronic devices. Kiosk 202, at least in some example embodiments, does not include a computer processor and/or its own camera. A user may utilize a smartphone, tablet computer or the like to capture one or more images of the trade device, to transmit the captured images to a remote server and/or operator, to receive a proposed trade value for the trade device and/or instructions for further evaluation, to provide payment or other compensation for the trade device, and to complete the transaction. For example, when kiosk 202 is deployed in a retail store that specializes in mobile services and/or equipment and a user brings in a tradeable device (e.g., such as electronic device 120 above), a sales associate may use his smartphone or an iPad or the like (e.g., such as electronic device 122 above) as an image capture device to take and transmit an image of the trade device to a server (e.g., such as data processing server 108 and/or call cancel 112) and to facilitate the interaction between the user and the server.

Transmission of the trade device information, such as the image captured, may be done in various ways. In an embodiment, email or other standard information messaging systems (SMS/MMS, iMessage etc.) may be used to communicate information to data processing servers (e.g., data processing servers 108) and/or call center operators (e.g., call center 112). Other embodiments may use a custom application or a web-page for transmitting trade device information, providing a better user experience.

Such embodiments may be used in conjunction with a diagnostic application running on the trade device, such as described in U.S. patent application Ser. No. 15/153,137 filed on May 12, 2016 and/or U.S. patent application Ser. No. 15/598,004 filed on May 17, 2017. Such diagnostic application on the trade device may provide additional information for the remote servers and/or the call center agents to make more accurate evaluation of the trade device value, the trade device make, model and completed tests.

Kiosk 202 comprises an upper container 204 configured to facilitate evaluation of the portable device, and a lower container 206 configured to collect and store trade devices.

The containers may be constructed, at least in part, with wood, particle board, plastic or other low cost material in order to keep the manufacturing costs low. For example, in some embodiments, the frame and sides of each container are made of wood and/or particle board. In some embodiments, one or both of the containers may include plastic and/or plexi-glass at least in portions. The first and second containers may be constructed with the same material or different materials or combinations of materials.

In the illustrated example embodiment, the first and second containers are both in the shape of rectangular boxes. However, some other example embodiments may have different shaped containers. For example, some example embodiments may include at least of the first and second container in a cylindrical shape. In still other embodiments, the two containers may have different shapes to each other. The containers may be constructed so that they are directly adjacent to each other. In some embodiments, the bottom of the first container and the top of the second container may be the same.

The first container 204 is configured to have a trade device (e.g., electronic device intended to be traded) positioned within in a manner that one or more images can be captured of the trade device. In one embodiment, the first container 204 includes an opening 212 through which the trade device is moved into the first container. The opening may be of a shape or size that permits a user to manually insert the trade device into the first container and place it on the bottom inside surface 214 of the first container. In some example embodiments, the first container includes a door (not shown) on one of its sides, such that the inside of the first container can be accessed by opening the door.

In some embodiments, the door (not separately shown) may be held closed (locked) by electromechanical means such as an electro magnet, solenoid or motor so that the first container is accessible only when the mini kiosk is operated normally, for instance, with the help of a salesperson application or through a website. In such embodiments, a minimal or bare-bones electronics and communications means may exist for a remote application or software to control such door, for example, a system-on-chip, a Bluetooth or Wifi enabled device, Internet of Things (for computer-less version) such as Arduino board or similar design or Raspberry pi type of low cost computing device for computer-based versions.

In some embodiments, the trade device may have at least a portion of a side (e.g., 210 side) open in order to facilitate access to the inside of the first container and also to facilitate the flow of light to the inside of the first container.

The inside of the first container may have one or more mirrors arranged at one or more positions (e.g., on the inside sides 212) around the location designated for placing the trade device. The mirrors may be arranged so that they capture reflections of the sides of the trade device, and the captured reflections are also captured in an image of the face of the trade device captured by a camera positioned at the top or bottom of the first container. The mirrors may include a single mirror, or multiple mirrors. In some embodiments, the mirrors are arranged so that every portion of every side of a trade device (e.g., rectangular or substantially rectangular smartphone, etc.) is captured in a reflection at least by one of the mirrors.

In some embodiments, additional cameras or additional image taking positions for the same camera may be used instead of mirrors to provide additional viewing angles. For example, two additional cameras placed at 45-degrees and having a view on the edges of the trade device combined with a top view and bottom view cameras provides additional view points without having to move the trade device inside the first container. It will be understood, that while multiple cameras can be used advantageously, only a single camera is necessary.

In some embodiments, a platform is formed on the bottom inside surface of the first container. The platform is sized and shaped for placing the trade device. In some embodiments, the platform is made of the same material as the bottom inside surface. In some embodiments, the platform may be constructed with a transparent material such as plexiglass.

In some embodiments, a unique computer-readable identifier such as one or more QR codes may represent a kiosk ID and may be included in the viewing area in a portion of the first container that does not interfere with the imaging. Using optical character recognition, QR or barcode reading technology, the system (e.g., data processing servers or application that process images) may be capable of confirming the location where a particular trade occurs.

In an alternate embodiment, the kiosk ID is placed elsewhere, which requires an additional step for the "trade application" (e.g., an app running on a kiosk premise representatives device or interaction control device, kiosk application or part thereof running on an interaction control device) to scan the kiosk ID so that the system is informed of the trade location.

In some embodiments, where there the first container includes a platform on which the trade device is to be placed, at least some of the mirrors may be arranged at an angle so that, in addition to reflection so the sides of the trade device, at least some portions of the bottom surface of the trade device are also represented in the reflections. In this manner, an image that captures the face of the trade device can also include reflections of the sides of the trade device and at least portions of the bottom surface of the trade device.

One or more sides of the first container may be constructed with a transparent material so that the flow of light to the inside of the first container is facilitated, and/or additional images of the trade device within the first container can be captured through the transparent materials of the sides.

The top 208 of the first container may be at least in part constructed from a transparent material. A transparent material may facilitate the inside of the container to have more light.

In some embodiments, a hole 220, with a size barely sufficient for a smartphone camera (e.g., such as a camera of electronic device 122) to capture an image of the face of the trade device is formed at or near the center of the top. The field of a camera placed over the hole so that it can capture an image of the face of the trade device may include the mirrors located around the trade device. In this manner the image of the face of the trade device, also includes reflections of the sides and/or portions of the bottom surface of the trade device. Therefore, the hole may be sized in accordance with the size of the cameras (e.g., camera lens, or lens and flash) that are expected to be used, the thickness of the top such that the top does not interfere with the field of the camera, and the distance to the mirrors from the center of the bottom surface such that the mirrors (or at least portions of the mirrors) are within the field of the camera placed at the hole and the reflected images in the mirrors would also be included in the image of the face of the trade device.

The height of the top container may be adjustable. For example, a first part and a second part of the top container may be moved relative to each other so that the height can be changed. The changeable height may be used to configure a height appropriate for the focal point of the camera to be used, and/or to change the size of the entire mini kiosk so that it may be fit to a more restricted place. In some embodiments, the height may be changed using pre-marked latch positions that are configured for optical image capture using one or more popular smartphone models.

The bottom container, as noted above, is configured to collect a plurality of trade devices. After a trade device has been subjected to an image capture in the first container, and the subsequent evaluation, and if the user and the system come to an agreement to trade the trade device, then the trade device is deposited into the bottom container to be stored until it can be securely transferred to another location for further processing.

In some example embodiments, the trade device is deposited into the bottom container through an opening 216 on a side of the bottom container. The opening may be sized so that it is large enough to accept trade devices upto a certain predetermined size (e.g., size of a larger smartphone, size of iPad etc.), but is too small to allow retrieving the deposited trade devices by hand or other retrieving device. The shape of the opening, in the inside, may also be configured to make it more difficult or substantially impossible to retrieve deposited devices using a retrieval tool.

In another embodiment, a mechanical door in the bottom of the top container and/or top of the bottom container such that the user, after confirming that the trade device is to be traded for agreed upon terms, can operate the mechanical door to drop the trade device into the bottom container from within the top container. The door may be operated by a user using a button, lever, slide or the like located on a side of the bottom container. In some embodiments, the doors may be operated by a minimal electronic setup that provides features such as door-locking etc., as described above in relation to a door in the top container. One or more safety mechanisms may be in place, to prevent (or minimize) accidental depositing of the trade device into the bottom container.

The bottom container provides for secure storage of the collected trade devices. In some embodiments, the only manner by which trade devices with the bottom container can be collected is by using opening a lock 218 on a door of the bottom container. In order to ensure that staff at retail locations where mini kiosks are located do not have access to the collected devices, the key to the lock may be maintained by another entity other than those at the retail location. Another manner by which this security may be provided is to have two or more locks that each requires a different key. The purpose to have multiple locks with different keys is so that different interested parties can have their own key and lock such that, the trade devices collected within the bottom container can be accessed only when all the interested parties are present. This security reduces the complaints about switched smartphones, missing trade devices, etc.

According to some embodiments, a collection bag, bin or the like may be arranged in the bottom container such that when the door is opened to collect the so far deposited trade devices, the collector does not have to gather them one by one, and instead can merely retrieve the collecting bag and tie the bag before forwarding it on for processing of the collected devices. In still other embodiments, the opening of the door may mechanically cause the tying/sealing of the collection bag.

In some example embodiments, the top container and bottom container may be moved relative to each other in an up/down direction. Such movement may affect the size of the area used for collecting trade devices. This feature may be used to adjust the size the mini kiosk for purposes such as fitting into restricted spaces.

Some embodiments may not include a bottom container, and may instead simply include a device receptacle such as a bag. In yet other embodiments, the bottom container may simply be non existent. In such embodiments, traded-in electronic devices may be stored apart from the kiosk, for example, in a secure bag, another safe located elsewhere, or somehow managed by the sales staff or representatives of the kiosk location.

In some example embodiments, the system may include a method for associating a sales person or representative from the kiosk location (i.e., representative who assists with accepting the trade-in electronic device) with a transaction. For example, the trade application may have a sign-in option, may require a pin code, password, thumbprint or fingerprint scan or may require the sales person to identify itself before or after performing an evaluation so that any transaction can be associated with the sales person. The identification can be made only once, for instance, if the sales person uses his personal phone. This identification mechanism may be useful in case there is a problem with the transaction. It can also be used to monitor the best sales persons, and optionally to give rewards or commissions.

Figure 3:
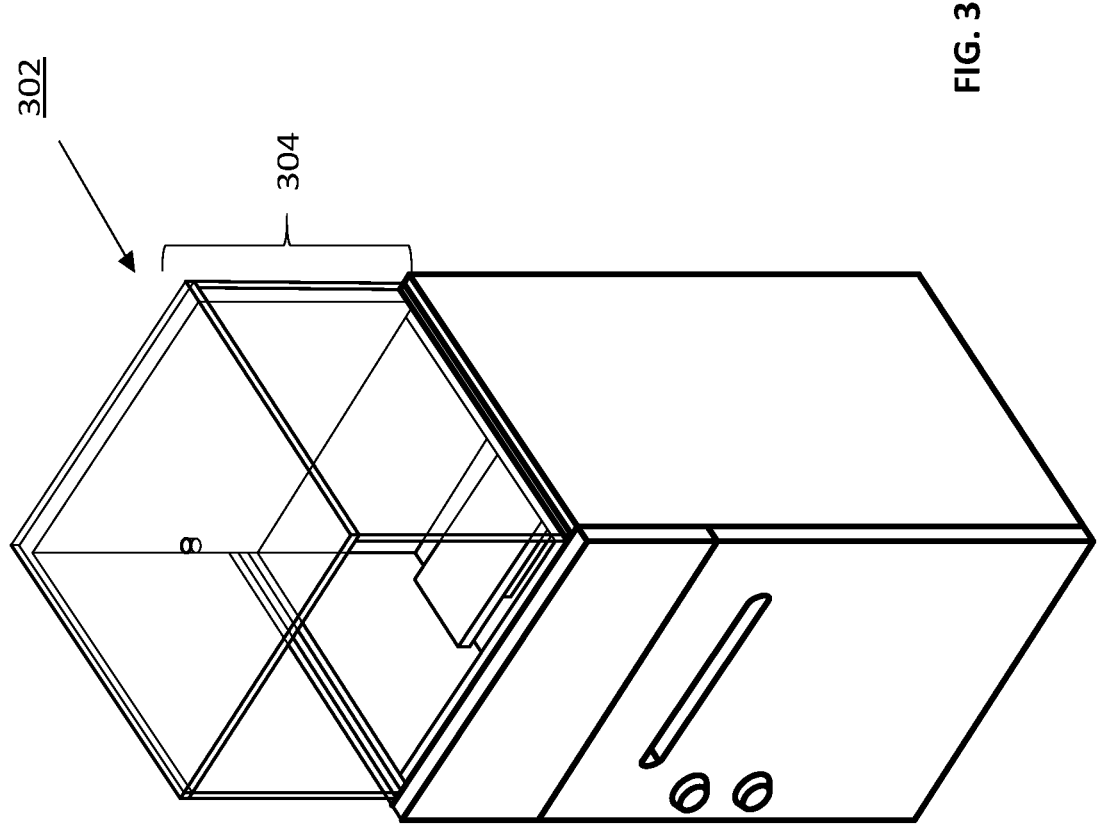
FIG. 3 illustrates another "computer-less" electronic device collection kiosk, according to some embodiments.

FIG. 3 illustrates another "computer-less" electronic device collection kiosk 302, such as mini kiosk 116 described above, according to some embodiments. Kiosk 302 may be similar to kiosk 202 described above, except where the top container 304 in kiosk 302 is on several sides and on the top made of a plexiglass-type transparent materials. A see through top container (or at least partially transparent top with one or more sides transparent or partially-transparent) may facilitate the flow of light to the inside of the top container, and may make the kiosk more attractive and interesting to users.

Figure 4:
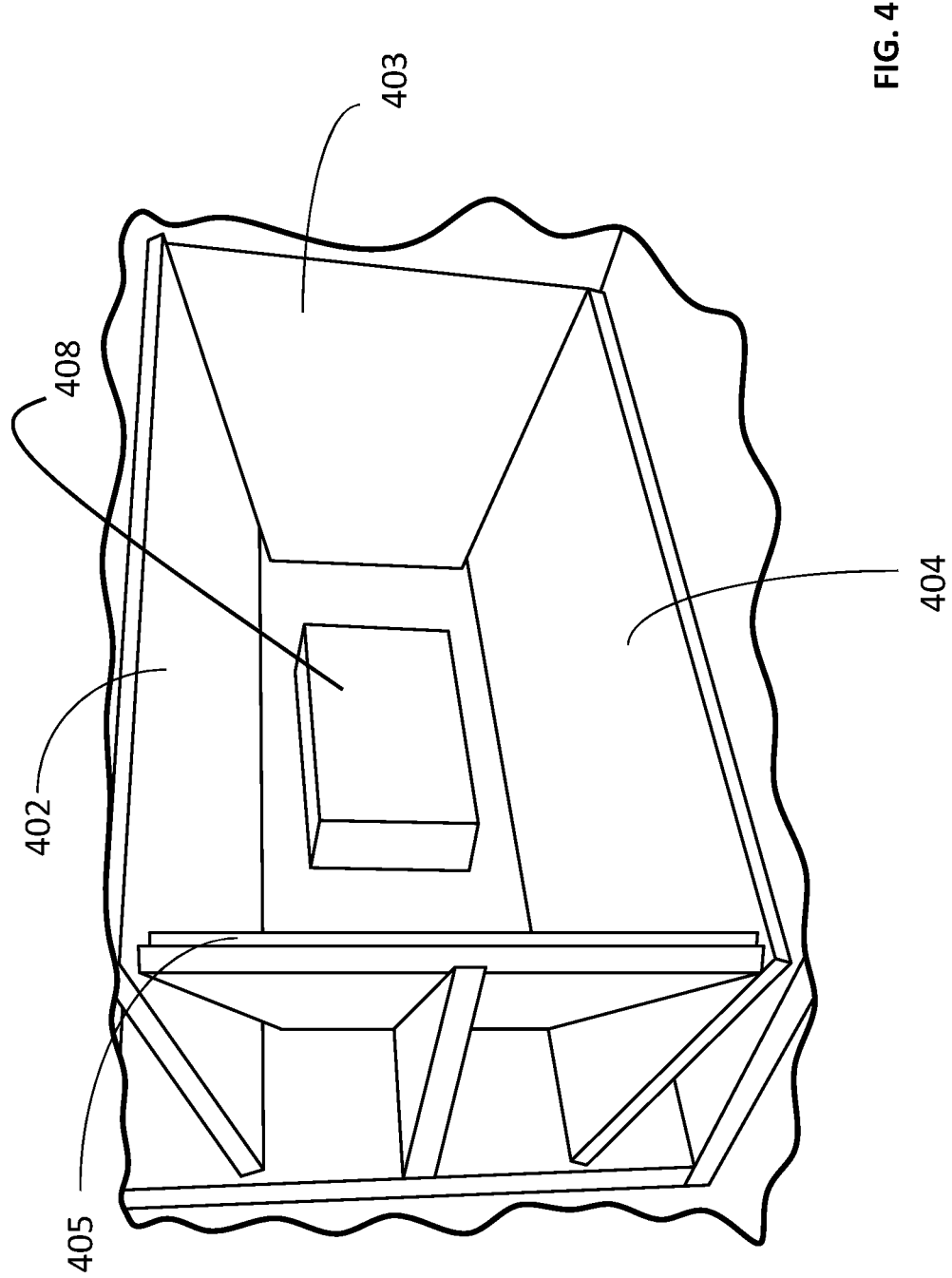
FIG. 4 illustrates the arrangement of mirrors inside a "computer-less" electronic device collection kiosk, according to some embodiments.

FIG. 4 illustrates the arrangement of mirrors inside a "computer-less" electronic device collection kiosk, such as kiosks 202 or 302, according to some embodiments. As illustrated in FIG. 4, one or more mirrors 402, 403, 404 and 405 may be arranged between a platform 408 which is configured to hold a trade device and the sides of the top container 204. As illustrated, the mirrors may be angled so that an image captured from the top will, in addition to the image of the face of the trade device, also include representations of the sides and/or bottom of the trade device that is reflected in the mirrors. In some embodiments, the angle may be configurable, e.g., via a mechanical adjustment mechanism. In some embodiments, the distance between the mirrors and the trade device can be adjusted, so that, for example, devices of different size can be easily imaged. The mirrors are ideally placed according to reflection physics taking into consideration the viewing angle of the camera 522, the focal length or distance between the camera and the area for positioning the trade device (524) so that the camera is capable of capturing the most significant pixels of the trade device and all of its reflections, in order to provide a picture containing various viewing angles of the trade device that will help in assessing the trade device condition, including defects.

Figure 5:
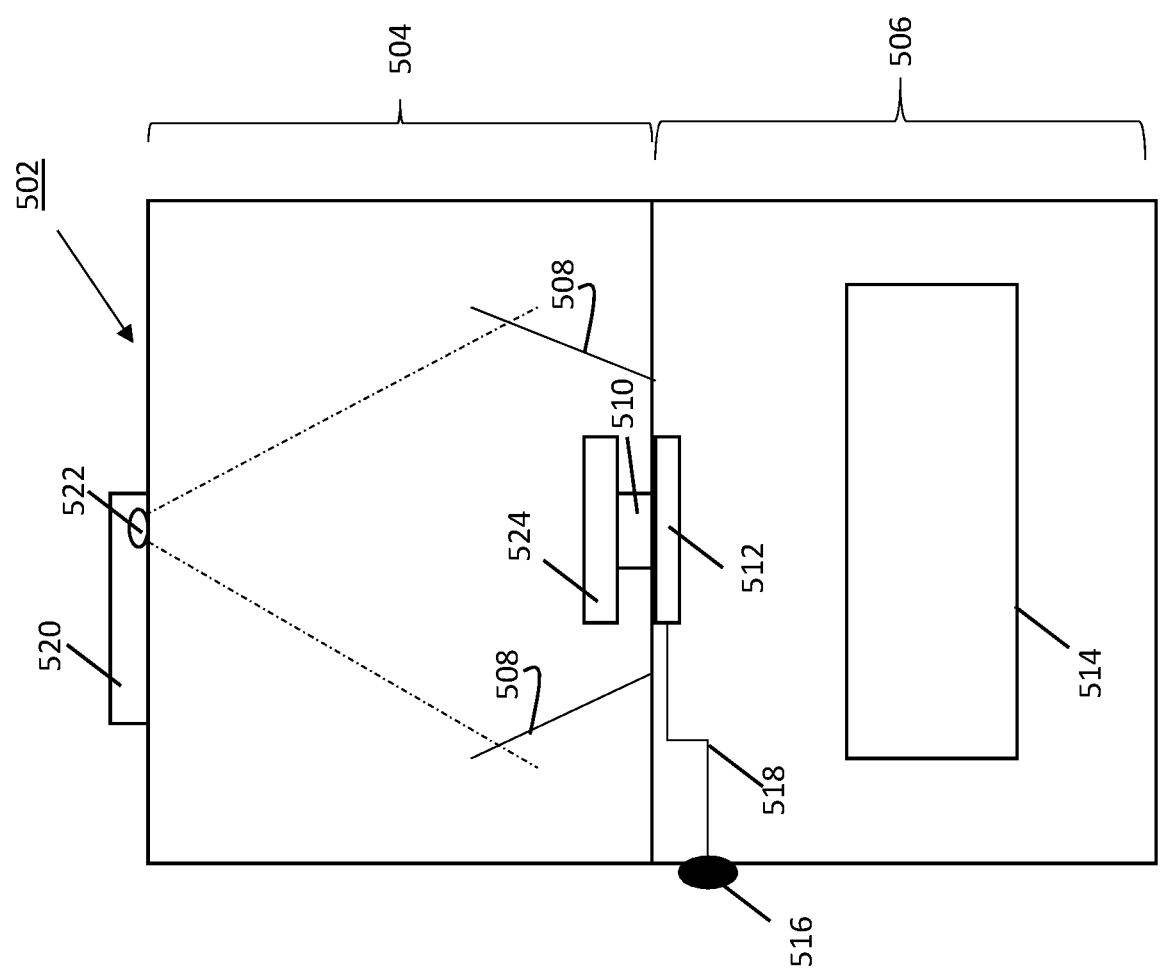
FIG. 5 is a schematic illustration of an image capture device being arranged to capture an image of an electronic device placed inside a "computer-less" electronic device collection kiosk, according to some embodiments.
Figure 6:
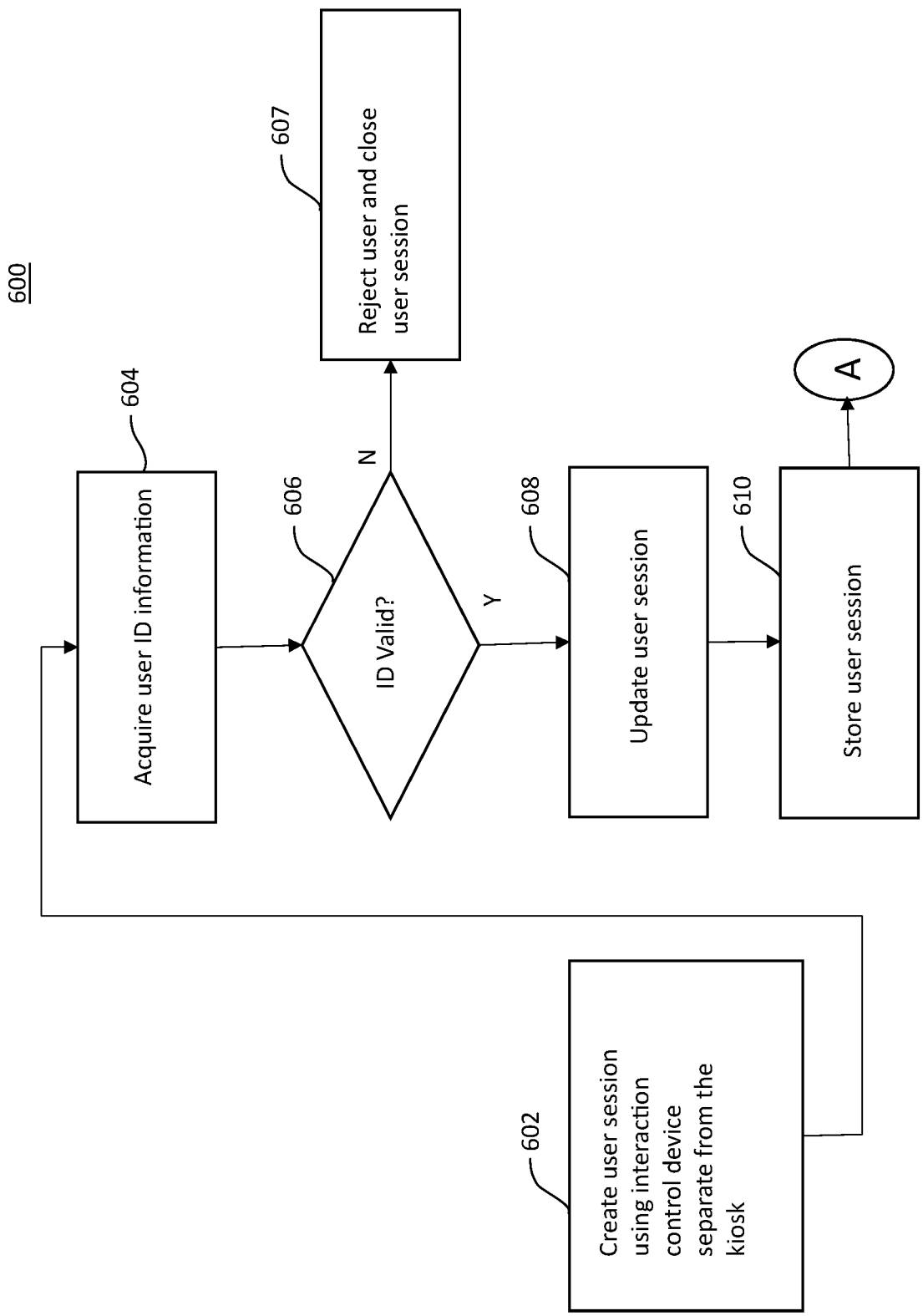
FIGS. 6-15 illustrate flowcharts of processes facilitating the operation of one or more electronic device collection booths according to some embodiments.

FIG. 5 is a schematic illustration of an image capture device 520 being arranged to capture an image of an electronic device 524 placed inside a "computer-less" electronic device collection kiosk 502, such as kiosk 116 above, according to some embodiments.

The image capture device 520, which may be a smartphone of a user (e.g., electronic device 122 described above), is positioned on the top panel of the top container 504 such that its camera 522 is positioned directly over a hole (not shown separately in FIG. 5) facing downwards. The field of view of the camera 522 may be arranged so that mirrors 508 are within the field of view, as well as the trade device 524 which may be placed on a platform 510.

A trap door 512 may be operated by a button, slide or switch 516 and via a mechanical mechanism 518 to open and close door 512. When the door 512 is caused to open, the electronic device 524 may fall into the collection bin 514 located in the bottom container 506 of the kiosk 502.

Some embodiments may provide for ensuring that the trade device was safely deposited inside the collection bin (e.g., bag, bin etc.). An example technique may include causing a kiosk app running on the trade device to take pictures inside the collection bin 514 where one or more QR codes or other computer-readable identifiers may be placed at strategic locations in order to confirm from the images that the trade device was indeed inside the bin of the particular kiosk. In another technique, the kiosk app running on the trade device may be caused to listen to audio or capture visual signals such as a specific sequence of light that is transmitted by a minimal electronic setup. For example, a minimalist electronic component, for example a micro controller programmed to toggle a signal on and off for controlling a LED for or speaker for an audio signal that may transmit such a "morse code like" audio sequence or binary information sequence by turning on/off an LED, wherein the sequence contains information to permit the kiosk app on the trade device (and/or subsequently the processors 108 or call center 112) to securely confirm that the trade device was securely placed in the intended bin 514. In some embodiments, such confirmation may trigger the generation of a trade coupon or the like.

In an example camera-enabled embodiment, for example, an embodiment including processor such as a Raspberri Pi or the like, a camera may be located inside the bin 51, and, by taking differential pictures may be able to confirm the placement of the trade device inside the bin 514.

FIGS. 6-30 illustrate flowcharts of a process facilitating the operation of one or more electronic device collection kiosks 116 according to some embodiments. Although operations of process 600 are shown in a particular order, it is understood that some embodiments may eliminate one or more operations, add one or more operations, and/or change the ordering of some operations.

FIGS. 6-30 of U.S. application Ser. No. 15/598,004 described processes of a trade device being evaluated and accepted when the trade device is brought to a full-featured kiosk 102. When the trade device is brought to a "computer-less" kiosk 116, however, since many of the functionalities that are available in kiosk 102 are not available in kiosk 116, some of the processing may not occurs or may occur differently that in the case of kiosk 102. In general, example embodiments using "computer-less" kiosk 116 may operate by using a device such as a user's smartphone or a tablet computer which operates as the image capture device and also as the input/output device for interactions with the back-send servers and call center personnel.

Process 600 may begin when a client enters a premises that houses a "computer-less" kiosk 116 and indicates to a premises assistant (or a like person who may supervise the local use of kiosk 116) that he/she (the client) would like to trade in an electronic device. At operation 602, the premises assistant may start a trade application on an interaction control device that is not part of the kiosk 116, and a user session is created. The interaction control device may be a smartphone (e.g., the premises assistant's personal smartphone), a tablet computer such as an iPad (e.g., an iPad used for day-to-day premises sales unrelated to the kiosk 116), or the like. The user session is intended to capture sufficient information to record the entire transaction for purposes including, for example, legal/contractual purposes, record keeping purposes and data collection purposes. As described below, in some embodiments, the client may have acquired the kiosk app before arriving at the kiosk, and enabled the kiosk app to collect information about the client and the trade device. Thus, in embodiments in which the kiosk app already has some information regarding the client and/or trade, the kiosk app acquired information may be transferred to interaction control device upon the client's arrival at the kiosk or kiosk premises, and the interaction control device may change or customize the following operations to only acquire information that has not been already acquired by the kiosk app.

At operation 604, optionally, the interaction control device captures an image of an ID card provided by the client. For example, the client may have provided a driver's license (or other similar ID card). The ID card is scanned and/or photographed on one or both sides in order acquire the client's ID information.

In embodiments which use an ID, at operation 606 it is determined whether the submitted ID is valid. In some embodiments, the scanned/photographed ID card information may be transmitted to a call center agent who verifies the information and communicates approval or disapproval. In other embodiments, at this stage, if certain basic predetermined parameters are satisfied for the scanned/photographed ID card, the ID may be assumed valid. For example, if the provided ID card is a driver's license, the interaction control device may determine, by running optical character recognition or the like upon the scanned/photographed ID card, a driver's license number and name, and that information may be communicated to an internet resource that can verify the authenticity of the ID card information.

In embodiments which use an ID, once the card is scanned, a picture of the client captured by the interaction control device may be sent to an OCR server. Through the use of APIs (e.g., Google Tesseract™ and Inlite ClearImage™), the server finds and decodes barcodes that may be present in the ID card or in the pictures and uses OCR to read any text. Thereafter, a check is made regarding whether the OCR data matches the data found in the barcodes. This helps automatically assess if the card is valid.

If the ID information is not valid, then the client may be rejected and the user session closed at operation 607.

If the ID information is found to be valid, at operation 608, the user session is updated to include the client's identification information. At this stage, the user session may be maintained in memory.

At operation 610, the updated user session is stored. The storing may be to non-volatile memory in the interaction control device. In some embodiments, the storing may also be to a remotely located storage server.

In some embodiments, ID identification may not be required options to bypass or to use other means may be made available to the person assisting trade. For example, a salesperson could enter a carrier account number in lieu of an ID.

In some embodiments, identification may be provided through the kiosk app running on the trade device as described in the previously filed application Ser. No. 15/598, 004, or on the kiosk app running on the representative's device in a similar manner. These steps may be useful for fraud prevention.

In some embodiments, an interaction control device (e.g., another smartphone, such as a sales person's smartphone) may directly connect (e.g., via a cable) to the trade device to run diagnostics, and one or more images of the trade device can be captured with the interaction control device's camera. The diagnostic information and images may then be transmitted to the remote data processing servers (e.g., servers 108) and/or call center (e.g., call center 112) which performs analysis of the information to arrive at a payment offer for the trade device. The communication with the client may be performed through the interaction control device, and the payment can be electronically transmitted to the client. A kiosk may not be required in such example embodiments (e.g., a kiosk-less operation). However, without the kiosk, certain capabilities for reliably identifying the trade location and for identifying the evaluated portable device as the device finally deposited may be difficult and/or not possible.

Figure 7:
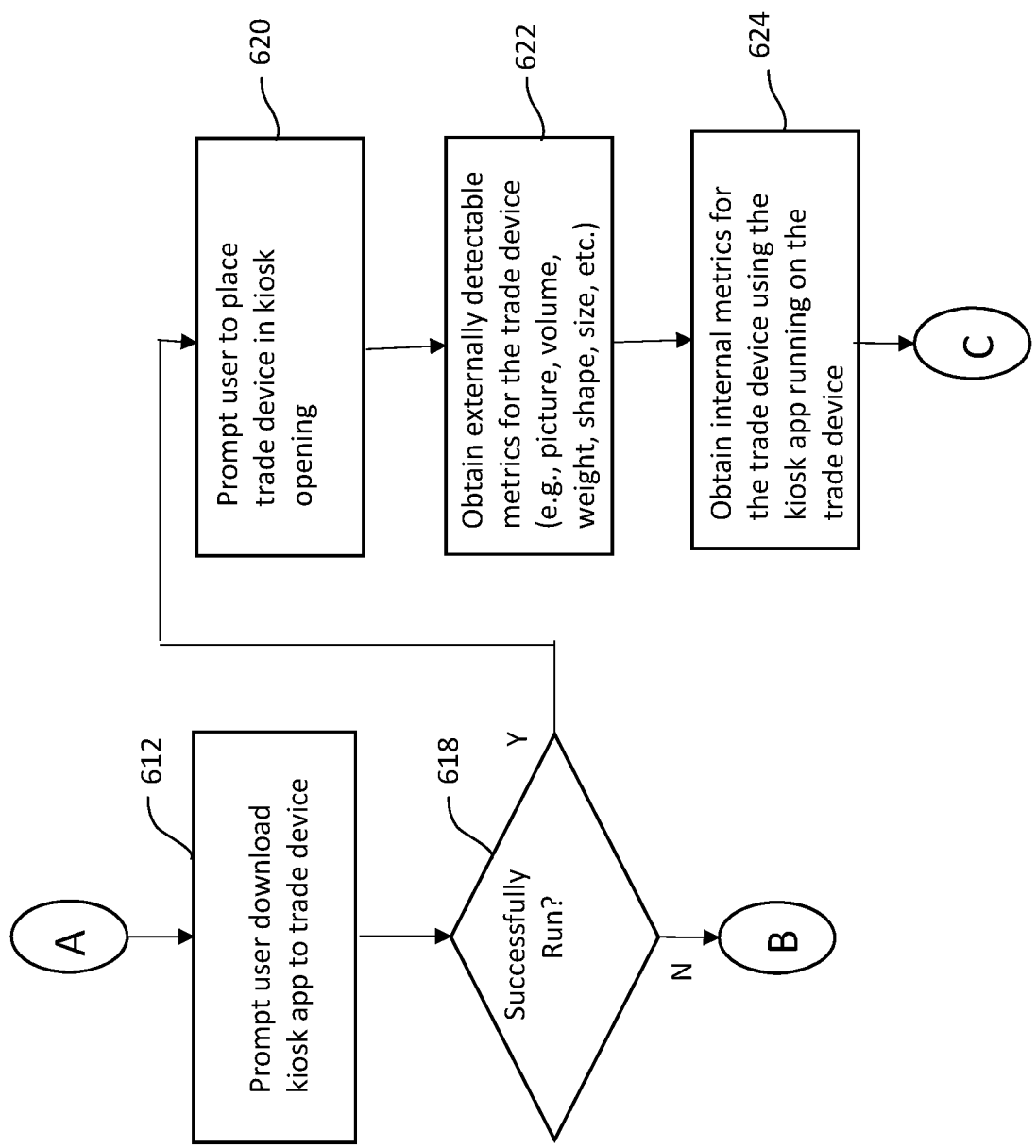

FIG. 7 illustrates a portion of flowchart 600 including operations 614 to 624. After operation 610, the flowchart 600 proceeds to operation 612. At operation 612 the client may be prompted to download the kiosk application ("kiosk app") to the trade device (i.e., the electronic device that the client intends to trade or submit for analysis by the kiosk). The prompting may be performed by displaying a message on the interaction control device. In some embodiments, a communication connection between the trade device and the interaction control device may be made using a wireless connection such as, but not limited to, WiFi or a form of near field communication (NFC) protocol. The communication connection may be used for the interaction control device to control the kiosk app execution on the trade device, and for acquiring information acquired by the kiosk app.

In some embodiments, a pre-evaluation of the trade device may be performed resulting in presenting the user with the initial payout offer amount. The pre-evaluation may occur at any point in the processing of process 600, but preferably occurs at an early operation before the client provides much input or spends much time. The pre-evaluation may be based upon one or more basic questions posed to the client, such as, questions for determining the age of the device, and questions for determining the condition (e.g., mint, good, damaged, broken) of the device, etc. Check boxes or other similar interface can be provided to determine the condition and, if determined to be damaged, a further set of checkbox choices may be presented to determine the type of damage (e.g., glass damage, damaged port, etc.). The client may be offered a chance to accept the pre-evaluation payout amount subject to scaled-down evaluation of the device and bypass the time consuming portions of the evaluation process, or to refuse the pre-evaluation payout amount and go through the entire evaluation process.

At operation 618 it is determined whether the kiosk app successfully executed on the trade device. This determination may be based upon the interaction control device or a remote server receiving a preprogrammed message from the kiosk app now running on the trade device. As described further below, the kiosk app may be configured to perform a series of diagnostic activities. As noted above, results from such diagnostic activities can be transferred to the interaction control device and/or remote server.

If the kiosk app was executed successfully, at operation 620, the client and/or premises assistant may be prompted to place the trade device in the kiosk for evaluation. This prompting may be delivered via the interaction control device's screen and/or the trade device's screen.

In certain example embodiments, the kiosk app is used to relay information about the device to the kiosk, central server and/or to the call center, to display instructions to the client and also as a security measure. The app and the interaction control device operate in tandem to make available an extensive test of each user device. Whereas some online and "brick & mortar" companies that accept used electronic devices in exchange for money, pay only after they get the phone into their hands (therefore adjusting the price once they physically test all features and see the phone's condition), in the example embodiments discussed herein, the service provider (e.g. entity purchasing the trade device) would desire to be as certain of the value of the device as possible because payment for the device is made to the client at the kiosk before the provider or any of its human operators physically receive it.

The kiosk app may collect the trade device's information (e.g., IMEI/MEID/ESN (if possible), brand, model #, carrier, CPU, RAM, SD card, etc.) and detects any peripheral that is attached to the trade device either directly (e.g., earphones, battery pack, charging cable, adapters etc.) or wirelessly (e.g., watch, headset, phone, thermometer, etc.). It gathers all this info and transfers it to the interaction control device and/or remote server. It then waits for further instructions. Certain information about the trade device, such as, for example, the age of the trade device and the condition of the trade device, may be determined based upon the client's responses to specific questions posed on a screen of the kiosk or on the trade device. As described in further detail below, in some embodiments, the information collection by the app running on the trade device may occur before the connection is made to the kiosk.

While the client is still handling the trade device, the kiosk app may (in some embodiments, under the control of the interaction control device and/or call center) also have the client test the physical buttons of the trade device (as a broken button significantly reduces a trade device's value). One or both the kiosk app and the interaction control device may instruct the client to press on the volume, home and on/off buttons (e.g., and other buttons specific to each model phone—since the kiosk app will have informed the kiosk or call center operator of the model). While this is going on, the kiosk or call center operator can (transparently to the client) have the kiosk app test things like, the accelerometer, the gyroscope, the GPS, Bluetooth, etc. Only when either the app has run through a standard predetermined test routine and/or the kiosk or call center operator has been satisfied that the trade device is ready to be placed within the kiosk will the client be permitted to place it in the kiosk opening for further evaluation.

Once the trade device is in the kiosk, the app and the interaction control device may still work in tandem to continue the testing. For example, the app may force the trade device to take pictures with one or both cameras (albeit within the kiosk) and transmit these to the server and have them available to the call center operator for evaluation. The kiosk may be configured with one or more particular markings for the purpose of being analyzed for quality when the markings are detected in images captured by the trade device's camera(s).

Once the trade device is in the kiosk, the interaction control device may send a unique identifier to the trade device which then displays it as a QR code on screen. The interaction control device reads back this QR code while taking pictures of the trade device which verifies that the trade device in the kiosk is really the trade device that is running the application. In some embodiments, patterns other than QR codes may be displayed and detected for this purpose. This security measure is important in order to avoid a situation where a client tries to run the application on two devices and put the lower valued one in the kiosk as the trade device.

The kiosk app can also test the trade device's speaker(s) by having the kiosk cue the app to play an audio file while the microphone in the interaction control device records it and sends results to the processing server (e.g. processing server 108). The reverse may also be done where the interaction control device will play a file through a speaker within the kiosk and cue the kiosk app to record it and send the results to the server or to the kiosk app. The server or the kiosk app may be configured to detect the known audio files and alert the agent if either the microphone or the speaker of the trade device is damaged.

At operation 622, one or more externally detectable metrics for the trade device (e.g., picture, volume, shape, size, etc.) are obtained. The interaction control device's camera may be utilized to capture images of the trade device. The images may be for determining the externally visible characteristics of the trade device. For example, visible indications of the type and model of the trade device, cracks, dents, scratches, etc. on the surface, missing buttons, etc. The kiosk may, in some embodiments, automatically determine, based upon images captured by a plurality of cameras, a volume, size and/or shape of the trade device. In some embodiments, a weighing scale may be integrated into a platform which holds the trade device when it is within the kiosk and that can detect the weight of the trade device. The weight may be displayed so that it can be captured in the image, or transmitted if such communication capabilities are present in the embodiment.

At operation 624, internal metrics for the trade device are obtained using the kiosk app running on the trade device. Internal metrics may include operating system, memory, manufacturer, model number, hardware features and configuration, battery status, network status, signal strength, audio quality, video display quality, etc.

Some embodiment are configured to one or more techniques for identifying the trade device. According to an embodiment, a first technique of identifying a device is also used to continuously upgrade the success rate of a second technique for identifying devices. The criteria to decide which technique to use may, in some embodiments, solely be based on whether a trade device can run the kiosk app or not.

If the trade device can run the kiosk app, the app may be programmed to cause the trade device to transfer all the information needed to identify itself to the system's servers. In some embodiments, the information can be deemed 100% accurate. The interaction control device takes pictures of the trade device to match the information decrypted from the QR code shown on screen against the information received directly from the trade device. All pictures and data may be sent to the call center where an operator can assess the information received and condition of the trade device (scratches, missing button, etc.). The pictures obtained this way are deemed to be accurate ones of the positively identified device so they can be used to further populate one or more central databases.

If the trade device cannot run the application (e.g., because it's not a smartphone or a compatible processor based device, it's broken, etc.) the trade device may be placed in the kiosk as is. The kiosk takes pictures of the trade device and sends those pictures to the call center or processing server. Once at the call center, the pictures are run through an algorithm which detects features of the device (device surface area, screen surface area, width/height ratio, color, button placement, edge features, markings). These values are then compared to pictures stored in a database to match possible candidates. The top candidates (e.g., top five candidates)—with maybe a percentage of certainty—are shown to the call center agent who then selects the correct one.

In some embodiments, a sales representative or the like may assist for trade devices that cannot run the app by entering the information on its interaction control device.

The server may be located at a remote location from a trade location where the server can receive information concerning a trade device evaluation, where the information includes at least one picture of an electronic trade device from a trader client, the server being operable to assess the condition of the electronic device from said at least one pictures and, with the help of a pricing method, the server is capable to return a quoted price to the trader. The trader client may be provided with a facility for accepting the quote. Upon acceptance of the quote, a transaction may be recorded in one of the server's records. The server, in some embodiments, may use the information is sent to the server via a mobile application programmed for such purposes as described above. In some embodiments, the information may be receive via a web site, and/or via an email where the one or more pictures are sent as an attachment to the email, or via a remote internet camera uniquely identifiable to a trader or a trade location.

Figure 8:
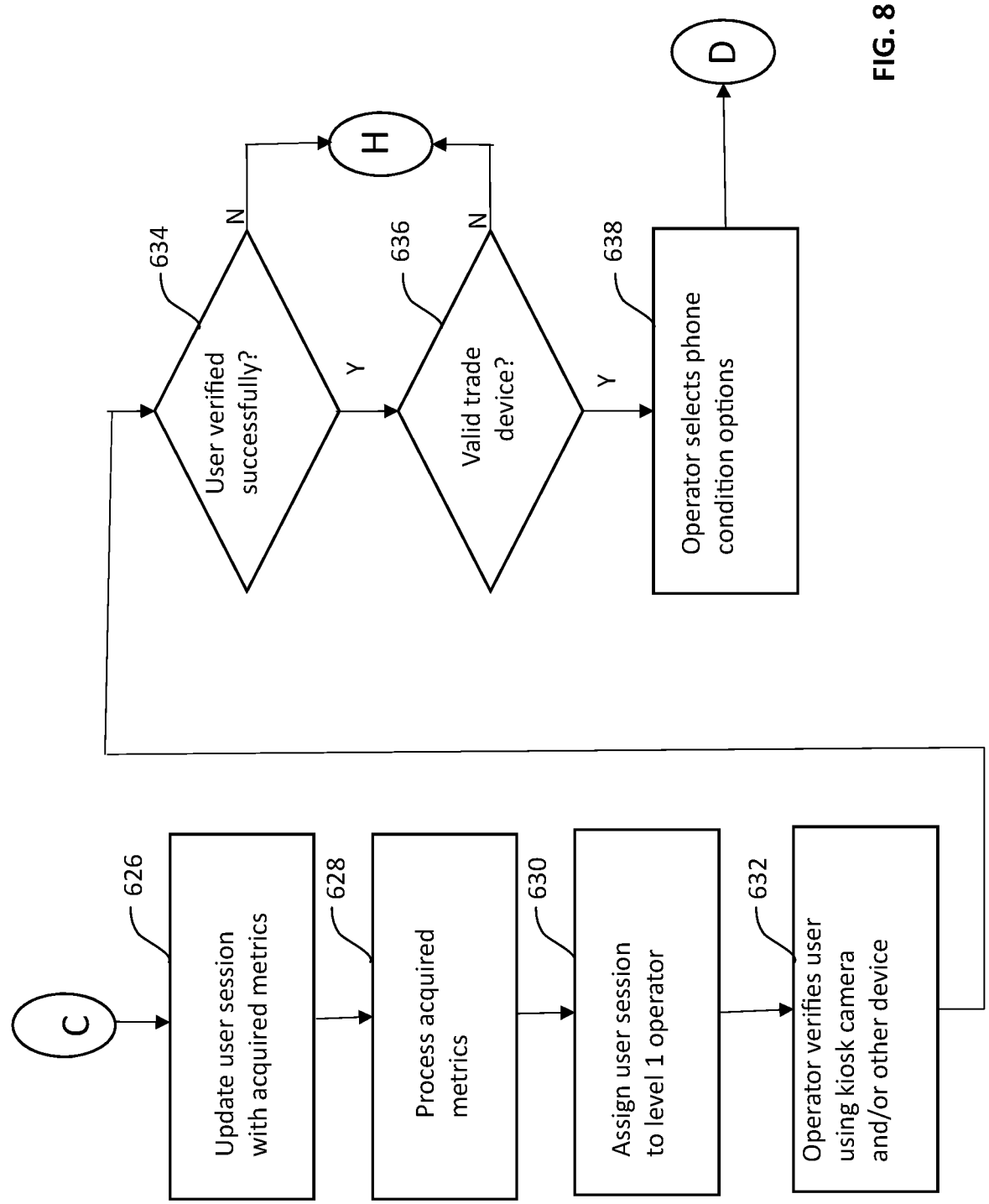

FIG. 8 illustrates a portion of flowchart 600 including operations 626 to 638. After operation 624, the flowchart 600 proceeds to operation 626. At operation 626, the user session is updated to include aspects of the collected metrics.

At operation 628, the acquired metrics are processed. The processing may include performing validity checks on some of the collected metrics. Processing may also include deriving one or more parameters based upon obtained parameters. For example, a remaining battery lifetime may be determined based upon the collected metrics of battery strength, battery type, and the type and model of the trade device.

At operation 630, the user session is assigned to a remote operator (e.g. a call center operator). According to an embodiment, where multiple levels of remote operators are available to service clients at kiosks, a level 1 remote operator is assigned to the user session based upon the specific criteria of this user session.

At operation 632, optionally, the remote operator verifies the client. Verifying the client may be based on the obtained information (e.g., ID card information) and images of the client as captured by one or more of the kiosk cameras or a camera of the interaction control device. For example, the remote operator may compare the image in the driver's license to the image captured by the camera in order to determine whether they match. If it is determined that they match, the remote operator determines whether the client is indeed the same person as the one identified in the provided card.

According to some embodiments, the call center agent may be a final decision maker for each and every transaction. In general, there are several factors that may be used in the call center operator's decision for the satisfactory completion of a transaction.

In some embodiments, the call center operator may have to be satisfied that the pictures taken of the client matches the picture(s) on the client's official ID Card, so that, for example, a reliable positive identification can be made. If the call center operator feels more pictures are needed, he/she can request, via the interaction control device, the premises assistant to acquire more pictures. In some embodiments, the call center operator may to acquire pictures using specified capture parameters (e.g., capture angle, zoom level, light level, etc.). The captured pictures may be transferred immediately after capture to the requesting call center operator.

The call center operator may also have to be satisfied that he can accurately identify the device submitted by the client at the kiosk, albeit with all the help that a database can offer him.

The call center operator may also have to be satisfied that the money (or other value means) offered to the client for their device is in line with all the rest of the information gathered up to that point—including the general condition of the device submitted.

For embodiments that use an ID, at operation 634, it is determined whether the client was successfully verified.

At operation 636, it is determined whether the trade device is valid. The call center operator may make this determination based upon all the metrics and other information gathered so far regarding the trade device from the scanning and from running the kiosk app.

At operation 638, the operator selects trade device conditions. The call center operator may be presented with various visual condition options. For example: cracked screen, blemishes, scratches, missing buttons, missing back cover, missing battery. The operator may also be presented with a general condition selector (i.e.: bad, poor, good, excellent, etc.) which will directly impact price. At this point, the operator may choose to decline the trade device, for example, due to unwanted attached options (i.e.: earphones, cables, non-genuine cover, etc.).

Figure 9:
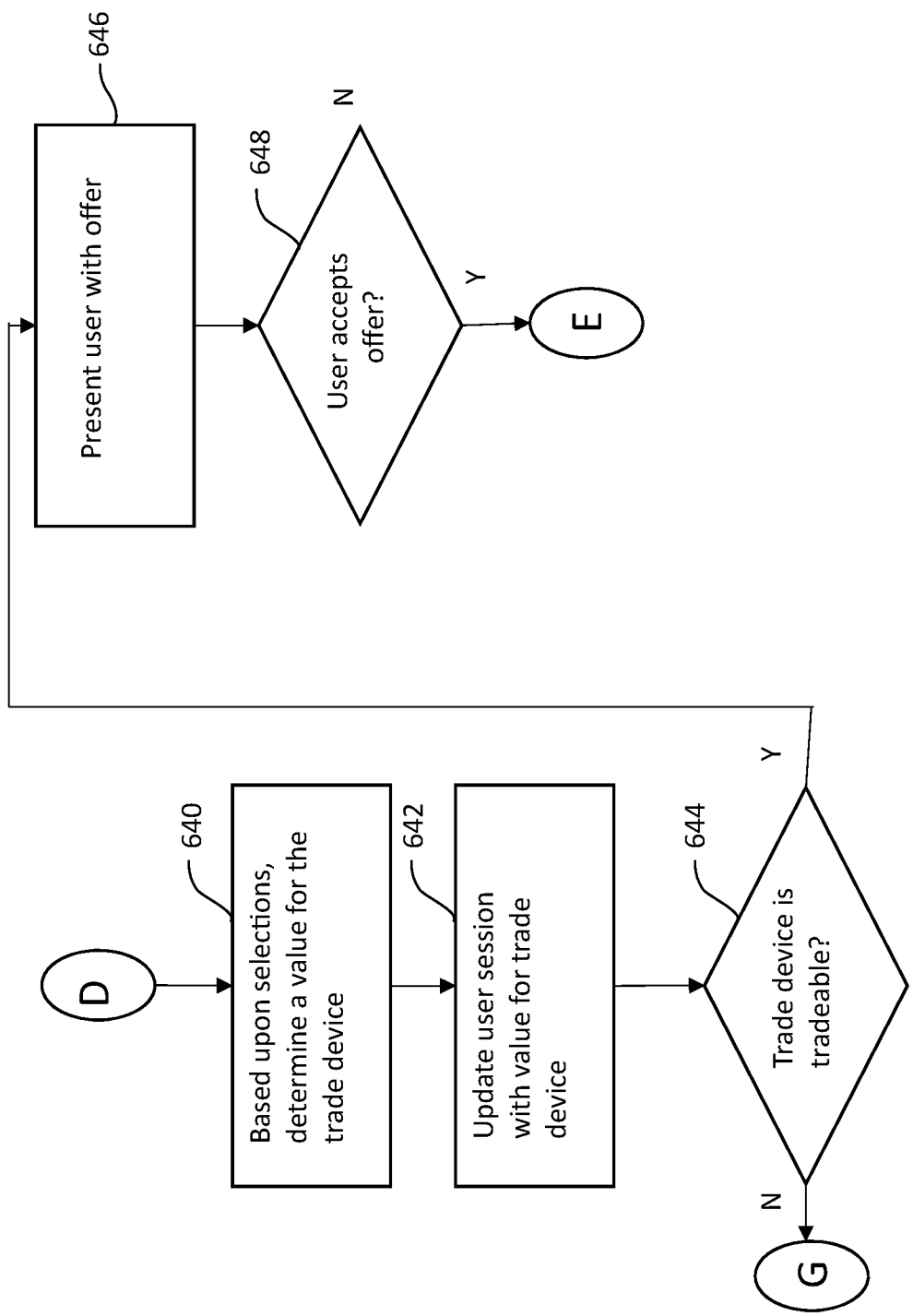

FIG. 9 illustrates a portion of flowchart 600 including operations 640 to 648. After operation 638, the flowchart 600 proceeds to operation 640. At operation 640, a value for the trade device is determined based upon the information gathered and the conditions selected previously.

At operation 642, the user session is updated with the estimated value for the trade device.

At operation 644, it is determined whether the trade device is tradeable. For example, if the estimated value for the trade device is above a predetermined threshold, then it is considered tradeable. Otherwise, it is untradeable. An example predetermined threshold value may be $0.

If the trade device is determined to be tradeable, at operation 646, the client is presented with an offer for the trade device. The offer may include a price that the kiosk operating company is willing to pay the client for the trade device. The price may be the same as the estimated value or may be based upon it. The offer may be presented by displaying the price and virtual buttons that the client can use to indicate acceptance or rejection of the offer.

Some business models for operating the kiosks, like the kiosks described here, call for the same company to own, distribute and service each kiosk directly. This model is prone to being very taxing to the company's finances as well as to their human resources.

In some embodiments, each kiosk 116 (or, in some cases, each group of kiosks) is sold to an independent business owner (IBO) who will then "subscribe" to services of a first company. The goal may be to offer flexibility and/or encourage geo-specific pricing. In order to achieve this model of operation, a plurality of different "subscription packages" can be offered. The IBO may start by purchasing (or in some occasions leasing) the package that consists of the kiosk with all of the software to use the kiosk—such as the kiosk app to run on the trade device and a trade app to run on the interaction control device. It is understood that kiosks 116 have no direct connection to a centralized call center operators and processing servers, and instead, rely upon connections to the call center/servers via the interaction control device and/or the trade device. Some examples of flexible subscription models include a basic model, geo-specific pricing model, or a combo pricing technique.

According to the basic pricing model, the IBO purchases the kiosk as well as the software that runs it (including the call center operators, etc.). What the user is paid for a traded device is determined based on factors such as the trade device's current wholesale value, the projected retail value, the amount of inventory currently or expected to be accumulated of that particular device, etc.

According to an example embodiment, the IBO's payment for a traded device is based on a scale that integrates one or more factors which may include the amount paid to the client, the total amount of units received by the IBO in a given time, the overall number of kiosks operated by the IBO, etc.

According to the geo-specific pricing model, the IBO purchases the kiosk as well as the software that runs it (including the call center operators, etc.). The system determines what the client is paid for a particular device based on factors like: the projected price that the trade device will be resold at the amount of inventory accumulating of that particular device, etc. One may also modify the pricing based on the geographic location of the kiosk.

The IBO may keep a small amount from each sale the amounts of which are determined on a scale (based on one or more factors which may include the amount paid for the trade device, the total amount of units received by the IBO in a given time, the overall number of kiosks operated by the IBO, etc.).

According to the combo pricing, the IBO purchases the kiosk as well as the software that runs it (including call center operators, etc.). The system may determine a recommended amount that should be paid for a particular device based on factors like: the amount paid once the device is sold, the accumulated amount of inventory etc. The IBO may be able to modify the amount paid to the client (within a min/max range) based on their own criteria. The trade device collection entity (e.g. first company) may share in the gains or losses—but is likely have a minimum amount that is received in any case. In some embodiments, previous transactions and/or other sources of transaction information may be processed to determine the amount of payment, and/or to determine other transaction information that can be displayed to the client. For example, previous transaction data from various sources can be analyzed to determine the prices paid by competitors for trade devices of similar type and characteristics.

At operation 648, it is determined whether the client has accepted the offer. The client may indicate acceptance of the offer by touching the appropriate virtual button displayed on the screen of the interaction control device. If the client intends to decline, he/she may instead touch a different virtual button for declining.

Figure 10:
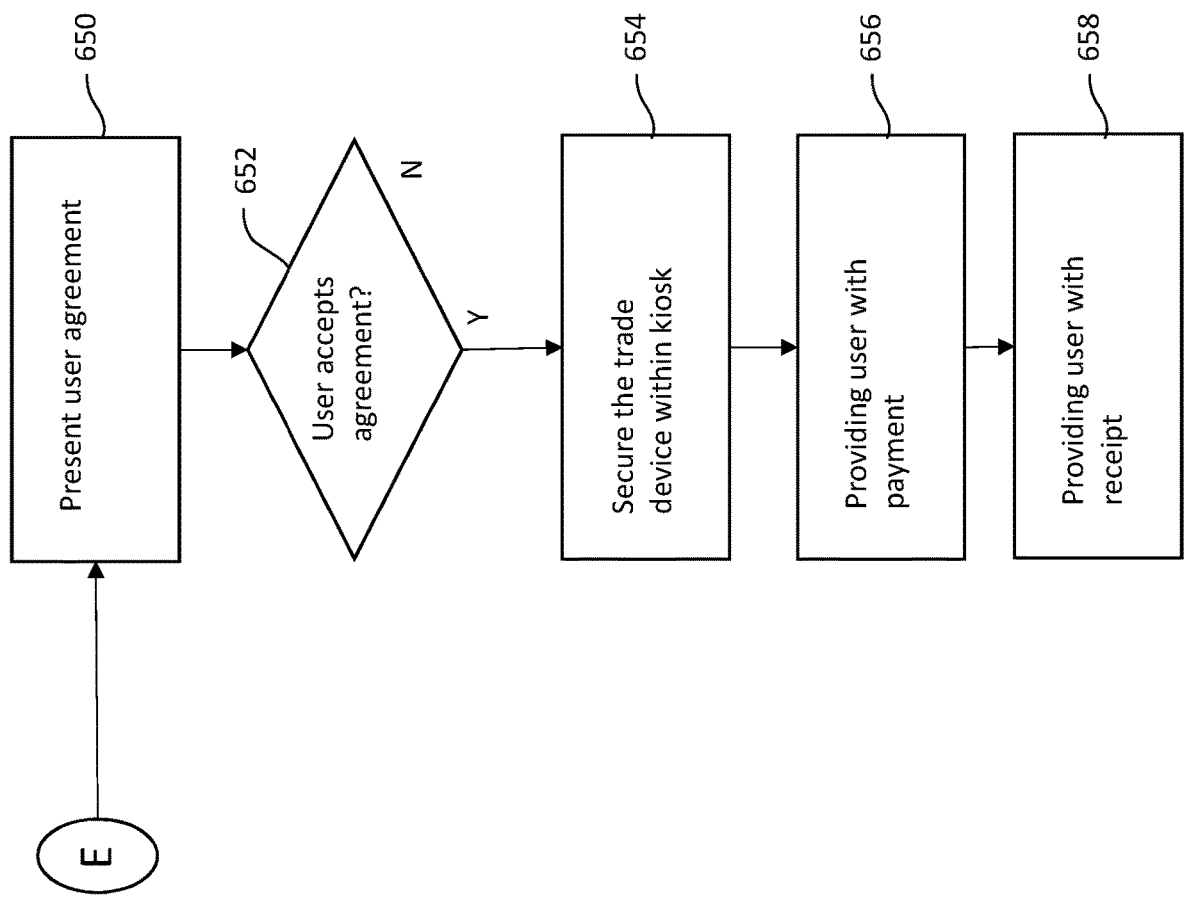

FIG. 10 illustrates a portion of flowchart 600 including operations 650 to 658. After operation 648, the flowchart 600 proceeds to operation 650. At operation 650, the client is presented with the agreement for trading the trade device. The agreement may be a standard form contract with certain fields filled in with information regarding the client's identity and address, the identification of the trade device, and, in some cases, the value for which the trade device is exchanged.

At operation 652, it is determined whether the client accepts the agreement. The client may indicate that he agrees with the agreement by pressing a displayed virtual button on the interaction control device. The kiosk app or the server can then generate an agreement ID and associate it with other information gathered in the transaction that uniquely identifies the client.

In an embodiment, the client may use on screen signature from the trade device or from the interaction control device or the computer-based kiosk touch screen to acknowledge the transaction.

At operation 654, the trade device is secured within the kiosk. In an example embodiments, the premises assistant may retrieve the trade device from the top container of kiosk 116 and deposit into the bottom container. In another embodiment, the premises assistant may operate a mechanical button or the like to open a door which drops the trade device from within the top container into the bottom container.

At operation 656, the client is provided with payment. The payment to the client of the agreed upon amount may be provided in one of a variety of means such as, but not limited to, Paypal transfer, email wire transfer or other credit may be provided in addition to, or in place of, cash. Coupons, redeemable at the local establishment where the kiosk is located or elsewhere, may be another form of payment dispensed in exchange for a trade device.

At operation 658, the client is provided with a receipt for the trade device. The receipt may indicate identifying information for the trade device, the time and date of the transaction, and the amount paid to the client in exchange for the trade device. In some embodiments, the client can select to receive his receipt by email or other electronic transfer. The receipt may include a coupon which may be in the form of a QR code, bar code, or other recognizable identifiers for a merchant to accept the coupon. In an embodiment of the invention, the IBO can be presented configuration options to configure coupons to be handed out for alternate payment methods, including, for example, a coupon to be handed out when a trade device has little or no value. The server may also send to kiosks or groups of kiosks instructions for distributing coupons by the kiosk.

Figure 11:
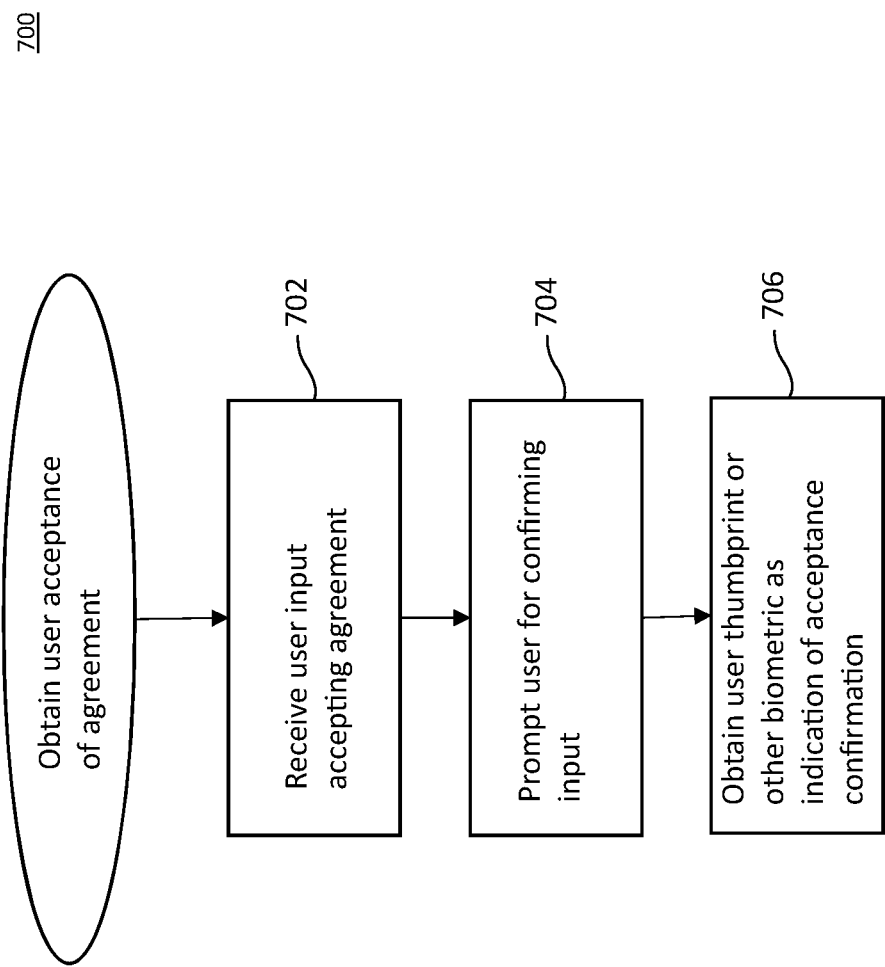

FIG. 11 illustrates a flowchart of a process 700 for obtaining the client's approval of the trade agreement. Process 700 may include operations 702-706. According to an embodiment process 700 may be executed when performing operation 652, for example, prompting the client to be indicated whether he/she accepts the agreement.

At operation 702, an input from the client is received indicating that the acceptance of the agreement. For example, the client may have touched the displayed virtual button corresponding to the acceptance.

At operation 704, the client is prompted for providing confirmation of the acceptance. The prompting may be via the screen of the kiosk and/or other device such as the interaction control device providing for communication with the client. For example, the client may be requested to provide a thumbprint as confirmation of the acceptance. In some embodiments, a different biometric can be used as a confirmation of acceptance, for example an eye scan, voice recognition, facial pattern recognition, etc.

At operation 706, a thumbprint reader is activated to obtain the client's confirmation.

In some embodiments, using a coupon for retail value, a web page can offer additional features for instance by allowing redemption accounting of the trade coupons. In such embodiments, a salesperson may verify using the web page by entering or scanning the coupon ID that the coupon has not yet been redeemed, or can use the website to redeem a partial value of a coupon.

Figure 12:
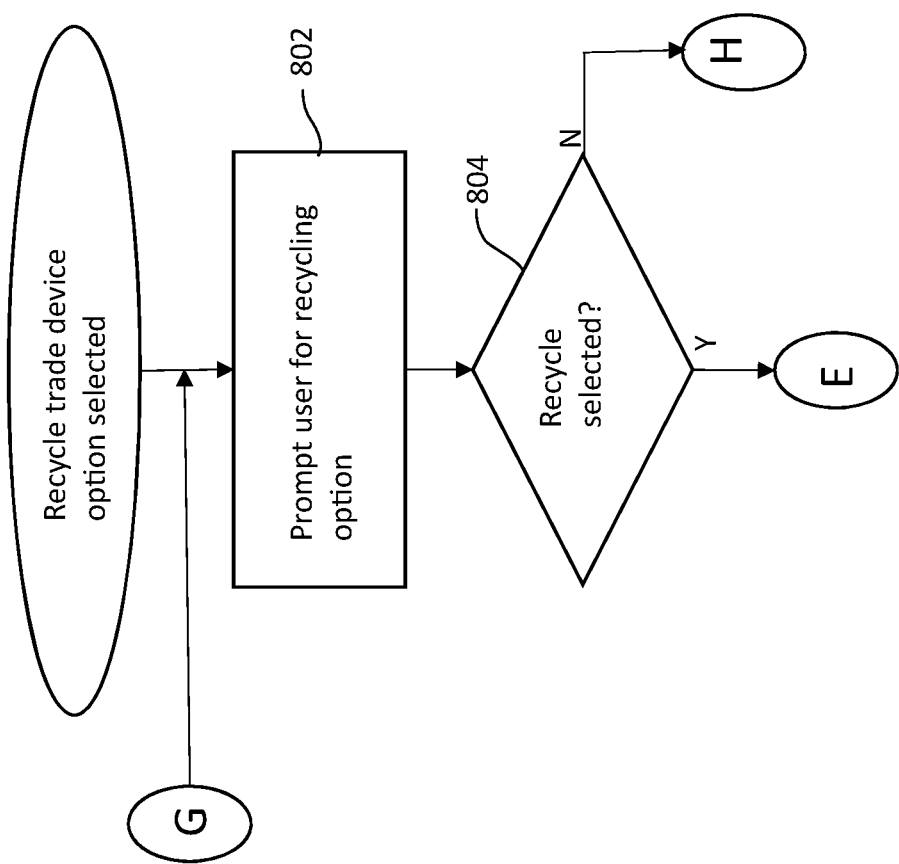

FIG. 12 illustrates a flowchart of a process 800 for determining whether to recycle the trade device. Process 800 may include operations 802-804. According to an embodiment process 800 may be executed when performing operation 644 determines that the trade device does not have a tradeable value.

At operation 802, the client is prompted to accept the option to recycle the trade device. For example, such an option may be provided when the system determined that the trade device does not have sufficient tradeable value.

At operation 804, it is determined whether the user has selected the recycle option. Subsequently, the process may proceed to present the client with an agreement and collect the trade device for recycling.

Figure 13:
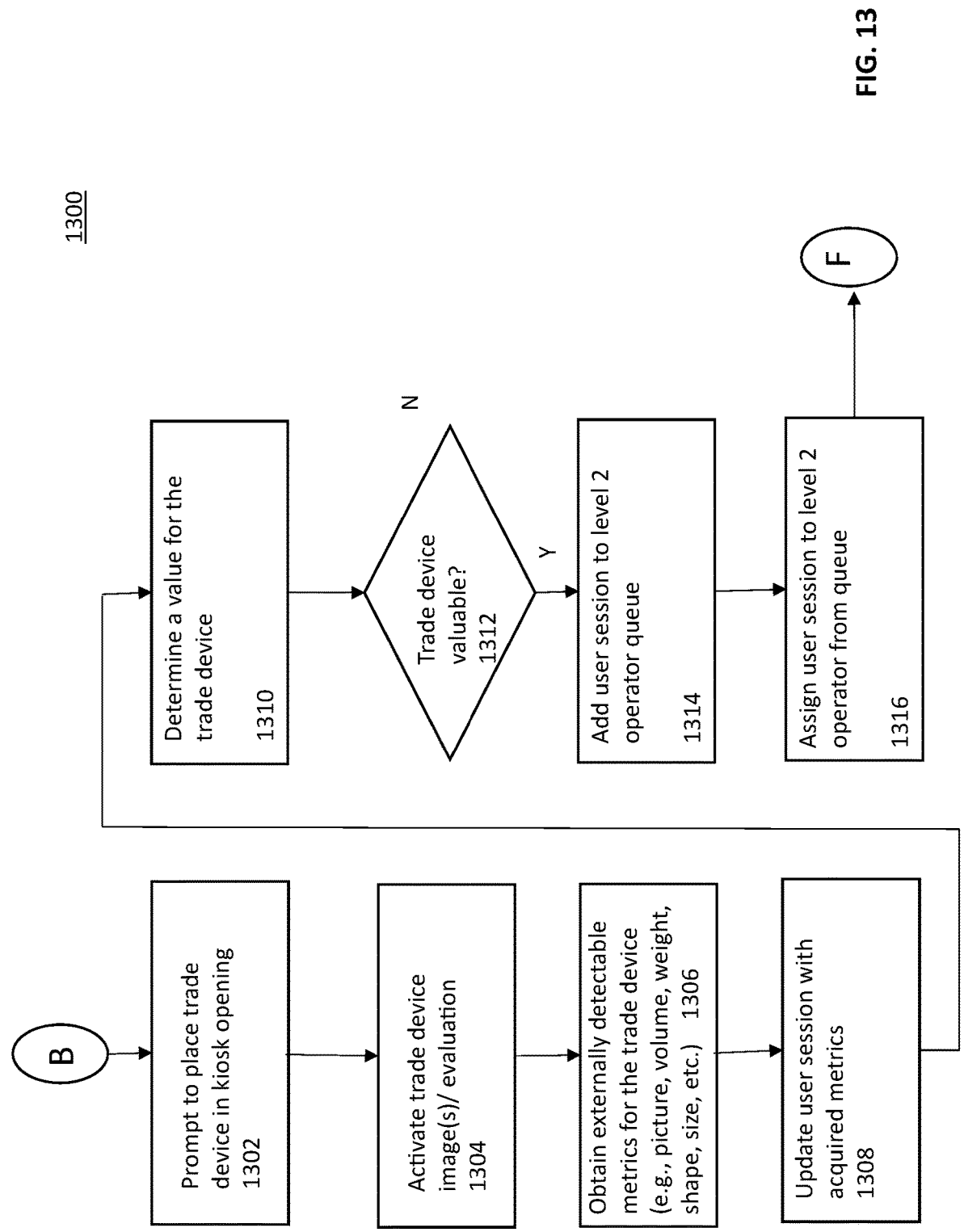

FIG. 13 illustrates a flowchart of a process 1300 for processing the trade device when the trade device cannot run, or for some reason does not run, the kiosk app. Process 1300 may include operations 1302-1316.

At operation 1302, the client is prompted to place the trade device in the kiosk opening At operation 1304, trade device image capture is performed and evaluation is activated.

At operation 1306, the evaluation of the trade device in the scanning chamber is performed. The evaluation includes detecting externally visible metrics such as size, shape, other visible characteristics that are determinable by capturing images of the trade device. Characteristics such as weight etc. may also be detected. However, because the kiosk app is not active, certain internal metrics may be unavailable.

At operation 1308, the user session is updated with obtained metrics.

At operation 1310, a value is determined for the trade device. The determination may be based upon the metrics obtained in the above operations.

At operation 1312, it is determined whether the trade device has sufficient tradeable value. If no, the trade device may be considered for recycling or returned to the client. If yes, the process 1300 proceeds to operation 1314 where the corresponding user session is assigned to a call center operator. In some embodiments, in this scenario where the kiosk app is not able to run on the trade device, the user session is queued to be assigned to a level 2 operator.

The queue servicing may be based upon the round robin discipline such that waiting clients at different kiosks are fairly treated. At operation 1316, the user session is assigned to an available level 2 operator. Level 2 operators are authorized and equipped for a greater level of engagement with the client than the level 1 operators.

Figure 14:
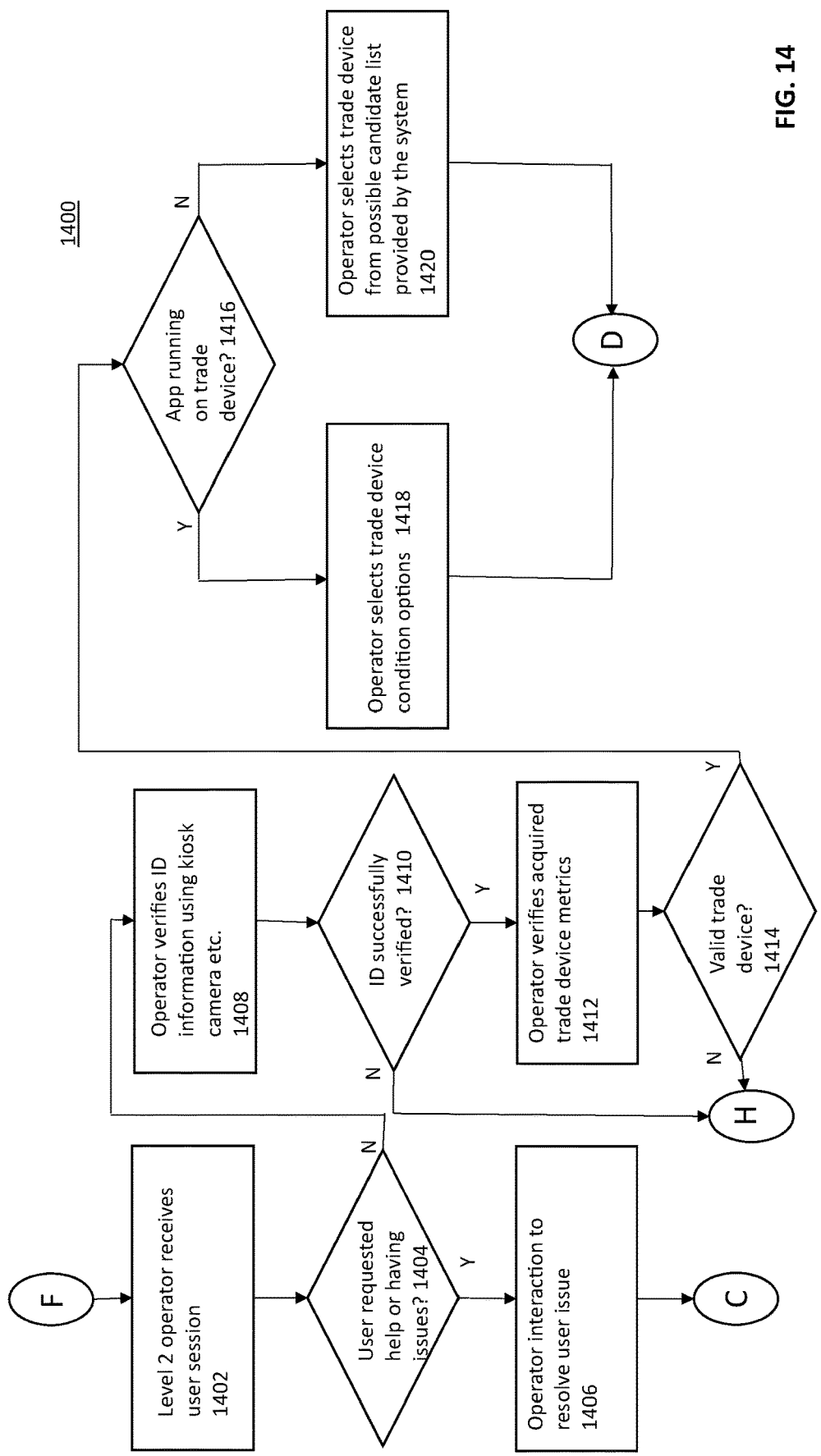

FIG. 14 illustrates a flowchart of a process 1400 for processing of a user session by a level 2 operator. Process 1400 may include operations 1402-1420. According to an embodiment process 1400 may be executed when, for example, a user session for transaction related to a trade device which does not run the kiosk app.

At operation 1402, the user session is obtained by the assigned level 2 call center operator.

At operation 1404, the operator determines whether the client has requested help or assistance.

If the client has indicated that he is having an issue, then at operation 1406, the operator directly interacts with the client to resolve the issues.

If the client has not indicated that he is having an issue, then at operation 1408, the operator may communicate with the premise assistant to further corroborate or determine the client provided ID information.

At operation 1410, for embodiments with use of ID, if the ID is successfully verified, the process 1400 may proceed to operation 1412 at which the operator may verify the acquired trade device metrics.

At operation 1414, it is determined whether the trade device is a valid device.

At operation 1416, it is again determined whether the kiosk app is running in the trade device.

If it is determined that the app is now running on the trade device, at operation 1418, the operator may utilize the app to further determine conditions of the trade device.

In the case that the app is not running on the trade device, or where the app is running, after certain trade device conditions are determined with the help of the app, at operation 1420, the operator may select a device option from a list of devices selected by the system.

As described above, an app to detect and diagnose various aspects of the trade device (for example, the kiosk app referred to above), may be downloaded to the trade device or another device (e.g., a second mobile device) from an app portal such as Google Play Store™ or Apple iTunes Store™. In some embodiments, the app may be downloaded to the trade device at any time prior to the trade device being placed in the kiosk, even before the trade device is near the kiosk.

In some embodiments, the app may be used by another device (e.g., a second portable electronic device which is not the trade device, another computer) to facilitate the evaluation of the trade device—for example, diagnostics of the trade device may be performed based at least on an image captured using the camera of the other device. Such diagnostics may be complementary to diagnostic performed by the kiosk and/or the trade device. The other device may be a smartphone, tablet computer, or other portable electronic device.

When the app is downloaded and installed on the second device, the app may provide for the client to enter information about and/or submit pictures of, the trade device, so that the time the user has to spend physically at the kiosk completing the trade can be significantly reduced. Reducing the time necessary for the user to spend at the kiosk, improves the user experience in using the kiosk to trade devices. It also provides for improving the kiosk's throughput for processing trade devices.

The reduction of the time required at the kiosk may be achieved by the app acquiring, either automatically or by the client manually entering, many of the pieces of information required for the trade before arriving at the kiosk and the app transferring the acquired information to the kiosk and/or the kiosk premise representative's portable device operating as a interaction control device when the client is near the kiosk. In some embodiments, the app may transfer the acquired information to the central servers (e.g., servers 108/110) from where the kiosk can subsequently access the information. The automatic acquisition of information by the second device may be by capturing an image of the trade device using the camera of the second device, using the microphone of the second device to record audio output from the trade device, etc. Captured image or audio of the trade device may be subsequently submitted to the kiosk or the central servers for analysis. Some of the analysis may be performed by the second device. One or more pictures and/or audio clips of the trade device may be submitted to the kiosk or the central servers by the second device before or soon after the client with the devices arrives at the kiosk. The information acquired by the app in advance may also include information pertaining to the client and/or the trade device.

The photographs of the trade device can be used to reduce the number of images of the trade device required to be captured by the kiosk. In certain embodiments, a comparison of the kiosk-taken image of the trade device and an app-taken image of the trade device can be used to confirm that the app-provided information relates to the same device imaged by or in the kiosk.

Figure 15:
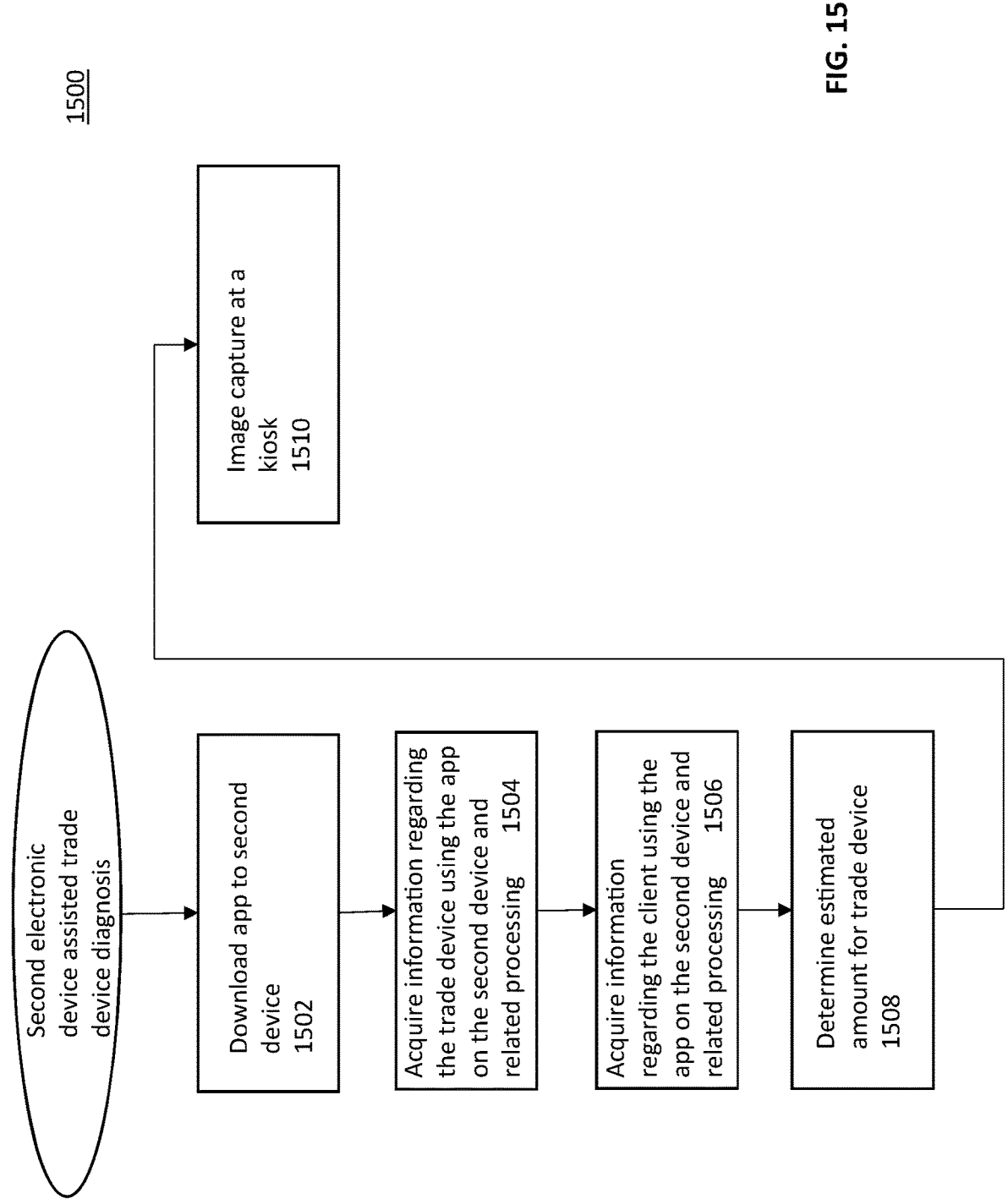

FIG. 15 illustrates a flowchart for process 1500 in which the client runs the kiosk app on a second device such as a second smartphone to gather information about the trade device. The app, in these embodiments, may be run before the trade device is near a kiosk. Although the following operations are described as part of the kiosk app, in some embodiments the operations may be performed by one or more apps that are separated from the kiosk app.

At operation 1502 the client downloads the app to the second device (e.g., a client's mobile phone which is not the trade device) from an app store or other network resource.

At operation 1504 the client starts the app. The app, running on the second device, may instruct the client to take one or more images of the trade device. The instructions may be displayed on the screen of the second device or may be output via the speaker. The instructions may specify that the front, back, and/or sides of the trade device are to be photographed, that one or more buttons on the trade device are to be pressed before the front display of the trade device is photographed so that what is displayed on its screen will be captured on the photographs, etc. Some of the aspects of the trade device to be detected from images captured by the second device were described above.

The app can be used by the second device to assess the features and functionalities of a trade device, at least partially, before the trade device is brought to the kiosk. For example, the app running on the second device can take at least one picture of a trade device and with processing by remote servers (e.g., servers 108 and databases 110) using technologies such as, but not limited to, computer vision, artificial intelligence, object recognition and defect recognition, the app is able to identify the trade device. For example, in order for a client to evaluate a trade device from an app running on the client's mobile device, the client may be instructed, by the call center operator and/or the remote server, to take a series of at least one photo of the trade device. The app on the second device then sends the series of at least one photo to a recognition server (e.g., in servers 108) for further analysis. The recognition server uses computer vision technologies to recognize features from the picture taken, such as, length, width, height, position of attributes such as buttons, microphones, logos, etc. The recognition server by having processed a multitude of images is capable of recognizing with a high accuracy the model of the trade device using artificial intelligence and computer vision models.

In an example embodiment, in order to classify the trade device make and model from images of the trade device itself, the recognition server may use a deep learning algorithm, such as, for example, convolution neural network (CNN), which uses a classification algorithm that has at least two phases. In the training phase the CNN is trained using a dataset comprised of images of known phones and their corresponding make, model and possibly attributes. In the prediction phase the CNN utilizes the trained model to predict phone make and model from phone images as well as possible attributes.

The CNN network may improve with training. There may be four steps in training the CNN.

In the first step of training the CNN, data preprocessing, the images may be processed for clarity and stored in a format that can be used by the recognition server. Specifically, the prepossessing step may consist of: histogram equalization on all training phone images, resize all training images to a fixed format, divide the phone training data into two sets respectively training set, for example a first set corresponding to, for example, five sixth of total image set and a validation set corresponding to the balance one sixth—the former may be used for training the model and the latter may be for calculating the accuracy of the model.

In the step of model definition, a CNN model and its parameters are defined. The defined CNN model may use for example a GoogleNET which is pre-trained on the ImageNet dataset. The use of pre-trained model is a technique referred to as transfer learning.

In the step of solver definition, the CNN model may be optimized. The accuracy of the model is computed using the validation set every predetermined fixed number of iterations (e.g., at every $i^{th}$ iteration, where i is preconfigured). The optimization is run for a maximum number of iterations i_max such as i_max>50*i.

In the step of model training, the CNN may be trained using the training set. As the loss and the model accuracy are monitored, the training process may be run until either a predetermined number of iterations is reached or the variation on the loss and the model accuracy is consistently below a predetermined threshold.

Once the training completes, the recognition server and/or the second device uses the trained CNN to make predictions on new images of phones.

In some embodiments and in conjunction with the above, the recognition server may also be configured to identify defects of the trade device based on the series of images, for example detecting that a screen is cracked or a button is missing or other attributes being altered. In order to do so, in some embodiments, the recognition server is capable of identifying analog defects in comparison to "mint condition" pictures by using various computer vision functions and libraries such as libraries available from OpenCV.

For example, in an embodiment of the invention for detecting defects, one method for detecting defects is based on images taken from at least one viewpoint and performing: (1) histogram of gradients (HOG) features; (2) transform image by applying homography transformation based on the four corners of the screen found in the previous step, (3) preprocess the image by grayscale conversion and Gaussian Blur application, and (4) find cracks using edge detector such as Canny edge detector.

In embodiments capable of detecting defects through the use of computer vision or artificial intelligence libraries, certain particular attributes may be of interests, such as "cracked screen", "missing button", "missing battery", etc. These attributes are stored and associated with the user session or the trade device for further processing, such as, for querying a price. Based on information identified above from a recognition and/or defect recognition server, taken from a series of at least one picture from either an automated kiosk or a second device capable of taking pictures, price analysis functions are performed to compute or select with the help of a database an estimated market price to be offered to the end user for the second device.

In some embodiments, at least one camera (of the second device or of the kiosk) taking images of the trade device may be an infrared camera capable of detecting defects that are otherwise left unseen by standard visible spectrum cameras. Similar models and methods for defect detections, as described herein, are applied to images generated by infrared cameras. In some embodiments, at least one camera taking images of the trade device may be a 3D camera capable of measuring depth. In some embodiments, cameras may be assisted by strategically located mirrors capable of extending the viewing capability of the camera toward the device both for device identification of the make and model or for defect detections, through techniques such as the above described techniques.

Further aspects of the trade device can be detected using the second device. In some embodiments, the client is prompted to dial *#06# on a first device such as a cell phone which in most cases causes the cellular phone to display the IMEI and, using another camera connected to the second device, computer code on said second device is capable of reading the IMEI displayed on the trade device, using optical character reading (OCR) technologies, which allows the second device to identify the manufacturer and model of the trade device by using an IMEI identifier functions or database which can retrieve such information from an IMEI. After displaying the estimated price, the kiosk may ask the client for an email or phone number to follow-up with additional instructions, for example an email or text message that includes link to download the app. The email may contain additional information, for instance a special promotion code that could lock the price offered for certain amount of time.

Alternatively, the client may be prompted to dial *#06# on a cellular phone (trade device) which in most cases causes the cellular phone to display the IMEI and thereafter the client may be prompted to take a screenshot when the IMEI is displayed. The app running on the second device can then request access to the client's picture and look in the last pictures taken to look for a picture containing an IMEI displayed. In order to do so, the app may have various models to compare the screenshot with in order to identify a screenshot that has an IMEI. For example, on an iPhone 6s the IMEI is displayed in an area beginning approximately at coordinates (210,520) within a rectangle of approximate dimension of 330×50. The app can also look at other screenshot features, for example the existence of the battery logo or the OK button.

At operation 1506, client information may be entered into the app. The client information may include client name, address, and other identifying information. In some embodiments, the client information acquired by the app may include images of the identification card, driving license, etc. of the client.

At operation 1508, an estimated amount is determined for the trade device. The estimated amount, at this stage, is determined based on the information currently acquired by the app. In some embodiments, the pricing information can be obtained from a pricing server. The pricing server and app interaction may operate in a manner similar to that described below in relation to process 1600.

At operation 1510, the client uses the kiosk. The information regarding the trade device acquired by the second device may be transferred to a central server either directly or via the trade app running on the interaction control device.

One or more images are captured of the trade device within the kiosk and transmitted to the central servers.

In some embodiments, based upon the image and/or audio information acquired by the second device, the central server may provide an estimated payout offer, that may be displayed to the client on the second device. In these embodiments, the central server may keep track of the estimated offer in association with a unique identifier for the trade device (e.g., the IMEI which may be acquired by image analysis). Subsequently, when the client submits the trade device to a kiosk, the offered payout after the complete diagnostic analysis in the kiosk may also take into amount the estimated payout offer which can be located based upon the unique identifier.

Many of the above techniques for transferring acquired information about the trade device to a central server may be used either by the trade device running the app as described in relation to process 1600 below or by the second mobile device running the app.

The app when run on the second device is useful for acquiring photographs and capturing audio output of the trade device. When run on the trade device, the app may acquire diagnostic information covering a substantially larger portion of the functions and features of the trade device.

Although particular embodiments have been described above, a person of skill in the art having been provided with this disclosure, would appreciate aspects of the different embodiments may be used in various combinations to realize still other embodiments of a technique and/or kiosk for recycling electronic devices.

While the embodiments presented herein have been described in detail, the foregoing description is in all aspects illustrative and not restrictive. It is understood that numerous other modifications and variations can be devised without departing from the scope of the disclosed embodiments.

What is claimed is:

1. A handheld-device imaging and collection booth, comprising:
   A first container and a second container attached to each other,
   wherein the first container comprises:
   a top panel arranged to enable an interaction control device comprising a processor and a camera to be removably positioned above the top panel to enable the camera to acquire a clear view of an inside of the first container, wherein the inside is an area enclosed by a plurality of side panels, the top panel and a bottom panel of the first container, wherein the top panel of the first container is also the handheld-device imaging and collection booth's top external surface on top of which the interaction control device is arranged; and one or more mirrors arranged facing the inside of the first container, such that an image captured by the camera through the top panel captures reflections, in the one or more mirrors, of the an handheld device placed within said first container, and wherein the processor of the interaction control device transmits the image to a remote server or a remote operator, wherein the processor of the interaction control device receives, in response to analysis of the condition of the hand-held device performed on the transmitted image by the remote server or the remote operator, purchase offer information for the handheld-device; and wherein the second container comprises a collection chamber configured to store the handheld-device.

2. The handheld-device imaging and collection booth according to claim 1, wherein the first container further comprises an elevated platform on an inside of a bottom surface of the first container, for placing the handheld-device such that at least a portion of the bottom surface of the handheld-device is represented in said reflections.

3. The handheld-device imaging and collection booth according to claim 1, wherein the first container includes an opening in at least one of the side panels, wherein a size of the opening is sufficient to accept the handheld-device into the inside of the first container.

4. The handheld-device imaging and collection booth according to claim 3, wherein the opening is in a single side of the first container.

5. The handheld-device imaging and collection booth according to claim 3, wherein one side of the first container includes a door such that the opening is formed only when the door is open.

6. The handheld-device imaging and collection booth according to claim 5, wherein the door includes at least one mirror of said one or more mirrors in its inside facing surface.

7. The handheld-device imaging and collection booth according to claim 1, wherein a height of the first container is configured in accordance with a focal length of a camera.

8. The handheld-device imaging and collection booth according to claim 7, wherein the height is adjustable.

9. The handheld-device imaging and collection booth according to claim 1, wherein the top panel includes an opening through which the camera captures the image.

10. The handheld-device imaging and collection booth according to claim 1, wherein the top panel is at least partially constructed from a transparent material such that the image is captured through the transparent material.

11. The handheld-device imaging and collection booth according to claim 1, wherein the first container is placed on top of the second container, and wherein at least a portion of the bottom of the first container and/or at least a portion of a top of the second container are configured to be operable to drop the handheld-device from the first container into the second container.

12. The handheld-device imaging and collection booth according to claim 1, wherein the second container includes an opening through which the handheld-device is deposited into the second container, and wherein the second container is configured to require at least two different keys or at least two different authentications in order to retrieve the handheld-device from the second container.

13. The handheld-device imaging and collection booth according to claim 1, wherein at least one of the first container and the second container is at least partially constructed in wood.

14. The handheld-device imaging and collection booth according to claim 1, wherein the portable electronic device is any one of a smartphone, a tablet computer, a laptop computer, a notebook computer, a smartwatch or a media player.

15. A method for imaging and collecting a handheld-device comprising:

placing the handheld-device inside a first container of an imaging and collection booth by inserting the handheld-device through an opening in a side of the first container, wherein the first container comprises a top panel arranged to enable an interaction control device comprising a processor and a camera to be removably positioned above the top panel to enable the camera to acquire a clear view of an inside of the first container, wherein the inside is an area enclosed by a plurality of side panels, the top panel and a bottom panel of the first container, and one or more mirrors are arranged facing the inside of the first container, such that an image captured by the camera through the top panel captures reflections, in the one or more mirrors, of the handheld-device placed within said first container, wherein the top panel of the first container is also the handheld-device imaging and collection booth's top external surface on top of which a portable electronic device is arranged;

capturing an image from a camera facing inside of the first container from a top of the first container, wherein the captured image includes a view of the handheld-device within the first container and views of one or more sides of the handheld-device reflected in the one or more mirrors;

transmitting, by the processor of the interaction control device, the image to a remote serve r or a remote operator;

receiving by the processor of the interaction control device, in response to analysis of the condition of the hand-held device performed by the remote server or the remote operator on the transmitted image, purchase offer information for the handheld device; and transferring the handheld-device from the first container to an adjacent second container for storage.

16. The method according to claim 15, wherein the transferring includes operating an opening in a bottom of the first container, and/or a top of a second container in order to deposit the handheld-device in the second container.

17. The method according to claim 15, further comprising preventing access to the handheld-device within the second container until at least two different keys or at least two authentications are used to unlock the second container.

18. The method according to claim 15, wherein the portable electronic device is a smartphone operated by a sales associate, and wherein the transmitting includes transmitting the image from the smartphone to the server.

19. The method according to claim 18, wherein the receiving includes receiving a message from the server, and displaying the received message on the smartphone.

20. A distributed system of kiosks for collecting handheld devices, comprising:

a central server;

a plurality of kiosks, wherein each kiosk includes a first container and a second container attached to each other, wherein the first container comprises:

a top panel arranged to enable an interaction control device comprising a processor and a camera to be removably positioned above the top panel to enable the camera to acquire a clear view of an inside of the first container, wherein the inside is an area enclosed by a plurality of side panels, the top panel and a bottom panel of the first container, wherein the top panel of the first container is also the each kiosk's top surface on top of which the interaction control device is arranged; and one or more mirrors arranged facing the inside of the first container, such that an image captured by the camera through the top panel captures reflections, in the one or more mirrors, of a handheld-device placed within said first container, and wherein the processor of the interaction control device transmits the image to a remote server or remote operator, wherein the processor of the interaction control device receives, in response to analysis of the condition of the hand-held device performed on the transmitted image by the remote server or the remote operator, purchase offer information for the handheld-device;

wherein the second container comprises a collection chamber configured to store the handheld-device; and a plurality of interaction control devices, each interaction control device configured to capture and image of an inside of a first container and transmit the image to the central server.

* * * * *